(12) United States Patent
Kalevo

(10) Patent No.: US 9,042,678 B2
(45) Date of Patent: May 26, 2015

(54) METHOD AND APPARATUS FOR REDUCING SIZE OF IMAGE DATA

(75) Inventor: Ossi Kalevo, Toijala (FI)

(73) Assignee: Nokia Corporation, Espoo (FI)

(*) Notice: Subject to any disclaimer, the term of this patent is extended or adjusted under 35 U.S.C. 154(b) by 562 days.

(21) Appl. No.: 13/145,110

(22) PCT Filed: Jan. 19, 2009

(86) PCT No.: PCT/FI2009/050046
§ 371 (c)(1),
(2), (4) Date: Jul. 19, 2011

(87) PCT Pub. No.: WO2010/081932
PCT Pub. Date: Jul. 22, 2010

(65) Prior Publication Data
US 2011/0274349 A1 Nov. 10, 2011

(51) Int. Cl.
*G06K 9/32* (2006.01)
*G09G 5/00* (2006.01)
*H04N 5/44* (2011.01)
*H04N 1/393* (2006.01)
*H04N 1/64* (2006.01)
*G06T 3/40* (2006.01)
*H04N 5/232* (2006.01)
*H04N 19/60* (2014.01)
(Continued)

(52) U.S. Cl.
CPC ........ *H04N 1/648* (2013.01); *G06T 3/40* (2013.01); *H04N 5/23229* (2013.01); *H04N 5/23245* (2013.01); *H04N 19/60* (2014.11); *H04N 19/117* (2014.11); *H04N 19/186* (2014.11); *H04N 19/80* (2014.11); *H04N 19/59* (2014.11)

(58) Field of Classification Search
None
See application file for complete search history.

(56) References Cited

U.S. PATENT DOCUMENTS 5,206,919 A * 4/1993 Keating ................. 382/296
6,236,433 B1   5/2001 Acharya et al.
(Continued)

FOREIGN PATENT DOCUMENTS

CN   1190824 A   8/1998
CN   1689322 A   10/2005
(Continued)

OTHER PUBLICATIONS http://alumni.media.mit.edu/~maov/classes/vision09/lect/09_Image_Filtering_Edge_Detection_09.pdf, 2013.*
(Continued)

*Primary Examiner* — Randolph I Chu
(74) *Attorney, Agent, or Firm* — Harrington & Smith

(57) ABSTRACT

An input image (IMG1) may be converted to a lower-resolution output image (IMG2) by: determining a location (OP) of an output pixel (P2) with respect to said input image (IMG1), determining values of elements (E) of a filter array (FA1) such that non-zero values of the elements (E) of said filter array (FA1) approximate a paraboloid reference surface (REFS), wherein said reference surface (REFS) has a maximum at a base point (BP), and determining a value of said output pixel (P2) by performing a sum-of-products operation between non-zero values of said elements (E) and values of input pixels (P1) of said input image (IMG1) located at respective positions, wherein said filter array (FA1) is superimposed on said input image (IMG1) such that the location of said base point (BP) corresponds to the location of said output pixel (P2).

18 Claims, 21 Drawing Sheets

(51) Int. Cl.
*H04N 19/117* (2014.01)
*H04N 19/186* (2014.01)
*H04N 19/80* (2014.01)
*H04N 19/59* (2014.01)

(56) References Cited

U.S. PATENT DOCUMENTS

| | | | |
|---|---|---|---|
| 7,236,191 B2 | 6/2007 | Kalevo et al. | |
| 7,405,740 B1 | 7/2008 | Neugebauer | |
| 7,417,673 B2 | 8/2008 | Wright et al. | |
| 7,468,752 B2 | 12/2008 | Kalevo | |
| 7,715,638 B2 | 5/2010 | Kalevo | |
| 7,965,889 B2* | 6/2011 | Ueyama | 382/167 |
| 8,045,047 B2 | 10/2011 | Nikkanen et al. | |
| 8,106,956 B2 | 1/2012 | Nikkanen et al. | |
| RE43,256 E | 3/2012 | Kalevo | |
| 2003/0077000 A1 | 4/2003 | Blinn et al. | |
| 2004/0233339 A1* | 11/2004 | Elliott | 348/743 |
| 2005/0128509 A1 | 6/2005 | Tokkonen et al. | |
| 2006/0072814 A1* | 4/2006 | Messina et al. | 382/162 |
| 2006/0170697 A1 | 8/2006 | Ueyama | 345/589 |
| 2007/0206000 A1 | 9/2007 | Haukijarvi et al. | |
| 2007/0230827 A1 | 10/2007 | Haukijarvi et al. | |
| 2008/0260291 A1 | 10/2008 | Alakarhu et al. | |
| 2009/0016644 A1 | 1/2009 | Kalevo et al. | |
| 2010/0020276 A1* | 1/2010 | Jepsen | 349/106 |
| 2012/0194708 A1 | 8/2012 | Nikkanen et al. | |

FOREIGN PATENT DOCUMENTS

| | | |
|---|---|---|
| CN | 1922859 A | 2/2007 |
| CN | 1942897 A | 4/2007 |
| CN | 101145336 A | 3/2008 |
| EP | 1727352 A1 | 11/2006 |
| EP | 1791086 A1 | 5/2007 |
| EP | 1968009 A2 | 9/2008 |
| GB | 2322252 A | 8/1998 |
| JP | 06-350397 A | 12/1994 |
| JP | 2005-261534 A | 9/2005 |
| JP | 2007-149092 A | 6/2007 |
| JP | 2008-512766 A | 4/2008 |
| JP | 2008-226233 A | 9/2008 |
| WO | 2004/034702 A1 | 4/2004 |
| WO | 2004/064402 A1 | 7/2004 |
| WO | 2005/106787 A1 | 11/2005 |
| WO | 2006/031213 A1 | 3/2006 |

OTHER PUBLICATIONS http://homepages.inf.ed.ac.uk/rbf/HIPR2/gsmooth.htm (Jun. 4, 2008) retrived by archive.org.*
Gonzalez et al. Digital image Processing, 2001, Prentice Hall, 2nd Edition, pp. 160-161.*
International Search Report and Written Opinion received for corresponding Patent Cooperation Treaty Application No. PCT/FI2009/050046, dated Nov. 19, 2009, 17 pages.
Dodgson, "Quadratic Interpolation for Image Resampling", IEEE Transactions on Image Processing, vol. 6, Issue 9, Sep. 1997, pp. 1322-1326.

* cited by examiner

```
        FA₁₁                                    FA₂₁
  m  ↘                                       ↘
n  0 0 2 3 3 1 0 0                0 0 1 3 3 2 0 0
   0 4 6 7 6 5 2 0                0 2 5 6 7 6 4 0
   2 6 8 9 9 7 4 0                0 4 7 9 9 8 6 2
   3 7 9 10 10 8 5 1              1 5 8 10 10 9 7 3
   3 6 9 10 9 8 5 1               1 5 8 9 10 9 6 3
   1 5 7 8 8 6 3 0                0 3 6 8 8 7 5 1
   0 2 4 5 5 3 0 0                0 0 3 5 5 4 2 0
   0 0 0 1 1 0 0 0                0 0 0 1 1 0 0 0
          BP                             BP

FA₁₂                                    FA₂₂        SUM=247
                                                           CF_H=3.5
   0 0 0 1 1 0 0 0                0 0 0 1 1 0 0 0
   0 2 4 5 5 3 0 0                0 0 3 5 5 4 2 0
   1 5 7 8 8 6 3 0                0 3 6 8 8 7 5 1
   3 6 9 10 9 8 5 1               1 5 8 9 10 9 6 3
   3 7 9 10 10 8 5 1              1 5 8 10 10 9 7 3
   2 6 8 9 9 7 4 0                0 4 7 9 9 8 6 2
   0 4 6 7 6 5 2 0                0 2 5 6 7 6 4 0
   0 0 2 3 3 1 0 0                0 0 1 3 3 2 0 0
          BP                             BP
```

FA_Gr

```
  →m
↓  0 0 0 0 0 0 0 0
n  0 4 0 7 0 6 0 1
   0 0 0 0 0 0 0 0
   0 7 0 10 0 9 0 4
   0 0 0 0 0 0 0 0
   0 6 0 9 0 8 0 3
   0 0 0 0 0 0 0 0
   0 1 0 4 0 3 0 0
            BP
```

FA_R

```
0 0 0 0 0 0 0 0
1 0 6 0 7 0 4 0
0 0 0 0 0 0 0 0
4 0 9 0 10 0 7 0
0 0 0 0 0 0 0 0
3 0 8 0 9 0 6 0
0 0 0 0 0 0 0 0
0 0 3 0 4 0 1 0
         BP
```

FA_B

```
0 1 0 4 0 3 0 0
0 0 0 0 0 0 0 0
0 6 0 9 0 8 0 3
0 0 0 0 0 0 0 0
0 7 0 10 0 9 0 4
0 0 0 0 0 0 0 0
0 4 0 7 0 6 0 1
0 0 0 0 0 0 0 0
         BP
```

FA_Gb    SUM=82
         $CF_H=4$

```
0 0 3 0 4 0 1 0
0 0 0 0 0 0 0 0
3 0 8 0 9 0 6 0
0 0 0 0 0 0 0 0
4 0 9 0 10 0 7 0
0 0 0 0 0 0 0 0
1 0 6 0 7 0 4 0
0 0 0 0 0 0 0 0
         BP
```

```
            BP
 0  0  0  0 \ 0  0  0  0
 2  0 12  0 ⌒14  0  8  0
 0  0  0  0  0  0  0  0
 8  0 18  0 \20  0 14  0      SUM=164
 0  0  0  0  0  0  0  0       CF_H=4
 6  0 16  0 18  0 12  0
 0  0  0  0  0  0  0  0
 0  0  6  0  8  0  2  0
```
FA_R

```
            BP
 0  0  3  0 \ 4  0  1  0
 0  4  0  7 ⌒ 0  6  0  1
 3  0  8  0  9  0  6  0
 0  7  0 10 \ 0  9  0  4      SUM=164
 4  0  9  0 10  0  7  0       CF_H=4
 0  6  0  9  0  8  0  3
 1  0  6  0  7  0  4  0
 0  1  0  4  0  3  0  0
```
FA_G

```
            BP
 0  2  0  8 \ 0  6  0  0
 0  0  0  0  0  0  0  0
 0 12  0 18  0 16  0  6
 0  0  0  0  0  0  0  0      SUM=164
 0 14  0 20  0 18  0  8      CF_H=4
 0  0  0  0  0  0  0  0
 0  8  0 14  0 12  0  2
 0  0  0  0  0  0  0  0
```
FA_B ated as PCT Application
METHOD AND APPARATUS FOR REDUCING SIZE OF IMAGE DATA

RELATED APPLICATION

This application was originally filed as PCT Application No. PCT/FI2009/050046, filed Jan. 19, 2009.

FIELD OF THE INVENTION

The present invention relates to compression of image data.

BACKGROUND

High resolution images may consume a lot of memory space or data transmission capacity. Compression of image data may be desirable.

It is known that the number of pixels of an image may be reduced e.g. by binning or decimation.

WO2005/106787 discloses a method and apparatus for reducing the resolution of a digital image by calculating weighted averages of pixel values.

SUMMARY

An object of the invention is to provide a method for compressing image data. A further object of the invention is to provide a method for determining values of a filter array suitable for compressing image data. A further object of the invention is to provide a computer program and a computer readable medium comprising said computer program for executing said methods. A further object of the invention is to provide an imaging device.

According to a first aspect of the invention, there is provided a method according to claim 1.

According to a second aspect of the invention, there is provided a computer program according to claim 16.

According to a third aspect of the invention, there is provided a computer readable medium comprising computer program code according to claim 17.

According to a fourth aspect of the invention, there is provided a device according to claim 19.

According to a fifth aspect of the invention, there is provided an image processing means according to claim 24.

According to a sixth aspect of the invention, there is provided a computer readable medium comprising a data structure according to claim 25.

The values of the elements of the filter array may approximate a paraboloid reference surface. Mathematical equations representing a paraboloid reference surface are relatively simple, and consequently the values of the elements may be calculated fast.

The values of said elements represent weighing coefficients. Weighing coefficients close to a centerline of said reference surface are greater than weighing coefficients, which are farther away from said centerline. This may help to preserve spatial modulation information.

The spatial modulation information may be preserved to a significant degree. This improves the quality of the output image.

The reduced size of image data facilitates storing of the image and transferring of the image e.g. via an interface or data bus.

The reduced size of image data may help to reduce power consumption of an imaging device or an image processing device.

The reduced size of image data facilitates image processing in later image processing steps, e.g. when adjusting the brightness of the image.

The embodiments of the invention and their benefits will become more apparent to a person skilled in the art through the description and examples given herein below, and also through the appended claims.

BRIEF DESCRIPTION OF THE DRAWINGS

In the following examples, the embodiments of the invention will be described in more detail with reference to the appended drawings, in which.

DETAILED DESCRIPTION

Figure 1:
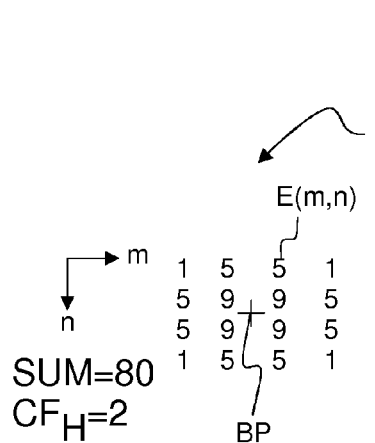
FIG. 1 shows elements of a 4×4 filter array.

FIG. 1 shows a filter array FA1. A digital input image IMG1 may be converted into a digital output image IMG2 by using the filter array FA1. The value of each output pixel of the output image may be determined by superimposing the filter array FA1 on the input image such that the location of said filter array FA1 substantially matches with the location of said output pixel, and by performing a sum-of-products operation between the values of the elements E of the filter array FA1 and the values of input pixels of said input image. When calculating the products of said sum-of-products operation, each value of a predetermined element E(m,n) is multiplied by the value of an input pixel whose location coincides with the location of said predetermined element E(m,n).

The image data of the output image IMG2 may be compressed with respect to the image data of the input image IMG1 by performing the sum-of-products operation. In particular, the output image IMG2 may have a lower image resolution than the input image IMG1.

The output image IMG2 may also be provided by calculating a convolution of said input image IMG1 with a filter array FFA, which is obtained by flipping the filter array FA1 horizontally and vertically. The flipped filter array FFA is identical with the filter array FA1 if the filter array FA1 is horizontally and vertically symmetrical. In fact, calculating the convolution comprises performing the sum-of-products operations for a plurality of pixels of the output image IMG2. The flipped array FFA may also be called as a convolution kernel.

The elements E(m,n) of the filter arrays FA1 and FFA represent weighing coefficients. Pixel values closed to the center of the filter array FA1 are given greater weight than pixel values further away from the center.

The sum-of-products operation may be used to implement a digital anti-aliasing filter and a sample rate compressor. In particular, the sum-of-products operation may be used to implement a spatial low-pass filter. The filter array FA1 may comprise elements E(m,n) arranged e.g. in at least four rows and in at least four columns. Hence, the filter array FA1 of FIG. 1 may be called as a 4×4 filter array.

The symbol m denotes the index of the column, and the symbol n denotes the index of the row. m and n are integers. The rows are aligned with a u-axis. The columns are aligned with a v-axis.

$CF_H$ denotes a horizontal scaling factor. In this case the horizontal scaling factor may be equal to 2, i.e. the filter array FA1 of FIG. 1 is suitable for dividing horizontal pixel density of an input image by two. The filter array of FIG. 1 is also suitable for dividing the vertical pixel density of an input image by two.

SUM denotes the sum of all elements E(m,n). The value of the SUM may be used e.g. to normalize the elements E(m,n), or to normalize the pixel values of the output image IMG2.

In order to simplify the nomenclature, the symbols E and E(m,n) are used herein to refer to the numerical value of a single element of a filter array, to a single element as an entity, and/or to all elements of a filter array.

Figure 2:
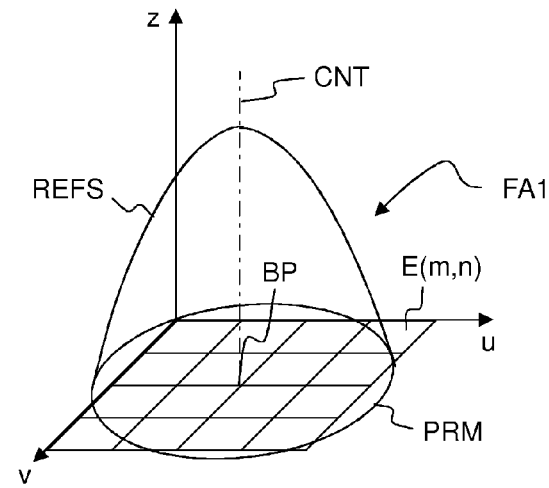
FIG. 2 shows, in a three-dimensional view, a paraboloid reference surface superposed over the locations of the elements of a 4×4 filter array.

The values of the elements E(m,n) of the filter array FA1 may approximate a reference surface REFS (see FIG. 2). The reference surface REFS has a centerline CNT which is perpendicular to the u-v-plane. The base point BP indicates the point of intersection between the centerline CNT and the u-v-plane. The base point BP may be positioned symmetrically or asymmetrically with respect to the locations of the elements E(m,n).

FIG. 2 shows a paraboloid reference surface REFS superimposed over the locations of the elements E(m,n) of a filter array FA1. The centerline CNT of the paraboloid may be located symmetrically with respect to the elements E(m,n) of the filter array FA1. The centerline CNT intersects the maximum of the paraboloid.

The values of the elements E(m,n) are indicated in the z-axis. The values of the elements E(m,n) may approximate values of a paraboloid reference surface REFS.

In other words, when the value of each element E(m,n) of a filter array FA1 is associated with the location of said element E(m,n) in the u-v-plane, the values of the elements E(m,n) of said filter array FA1 represent points which are close to said paraboloid surface. In particular, said points may be on said paraboloid surface.

The paraboloid reference surface REFS reaches the zero level on the perimeter PRM. Elements E(m,n) whose centers are on the perimeter PRM or outside said perimeter may have zero value.

Figure 3:
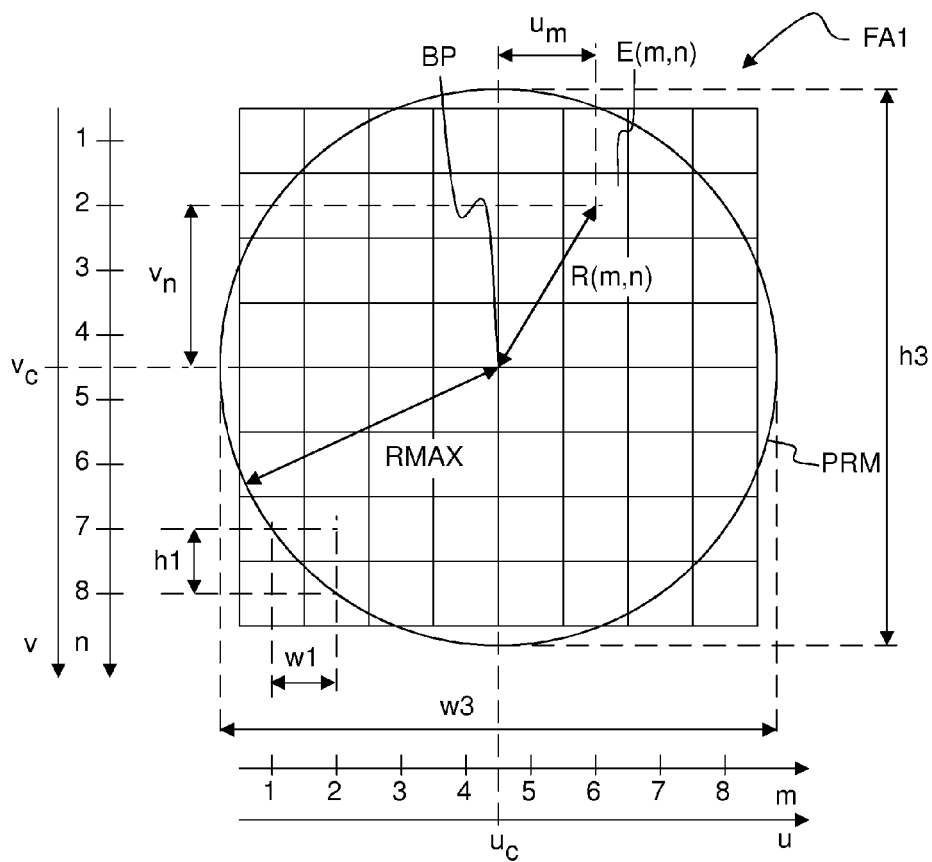
FIG. 3 shows distances of the elements of a 8×8 filter array from a base point.

FIG. 3 shows the positions of elements E(m,n) of a filter array FA1 with respect to a base point BP. The symbol $u_m$ denotes a horizontal distance between the center of an element E(m,n) and the base point BP. The symbol $v_n$ denotes a vertical distance between the center of said element E(m,n) and said base point BP. The symbol R(m,n) denotes a distance of the center of said element E(m,n) from said base point BP.

The perimeter PRM may be elliptical. The symbol w3 denotes width of the ellipse PRM. The symbol h3 denotes the height said ellipse PRM.

The half value of w3 may represent the minor axis of an ellipse PRM, and the half value of h3 may represent the major axis of an ellipse PRM, or vice versa.

In case of a circle, the width w3 is equal to h3. Circle is a special case of an ellipse.

Figure 5:
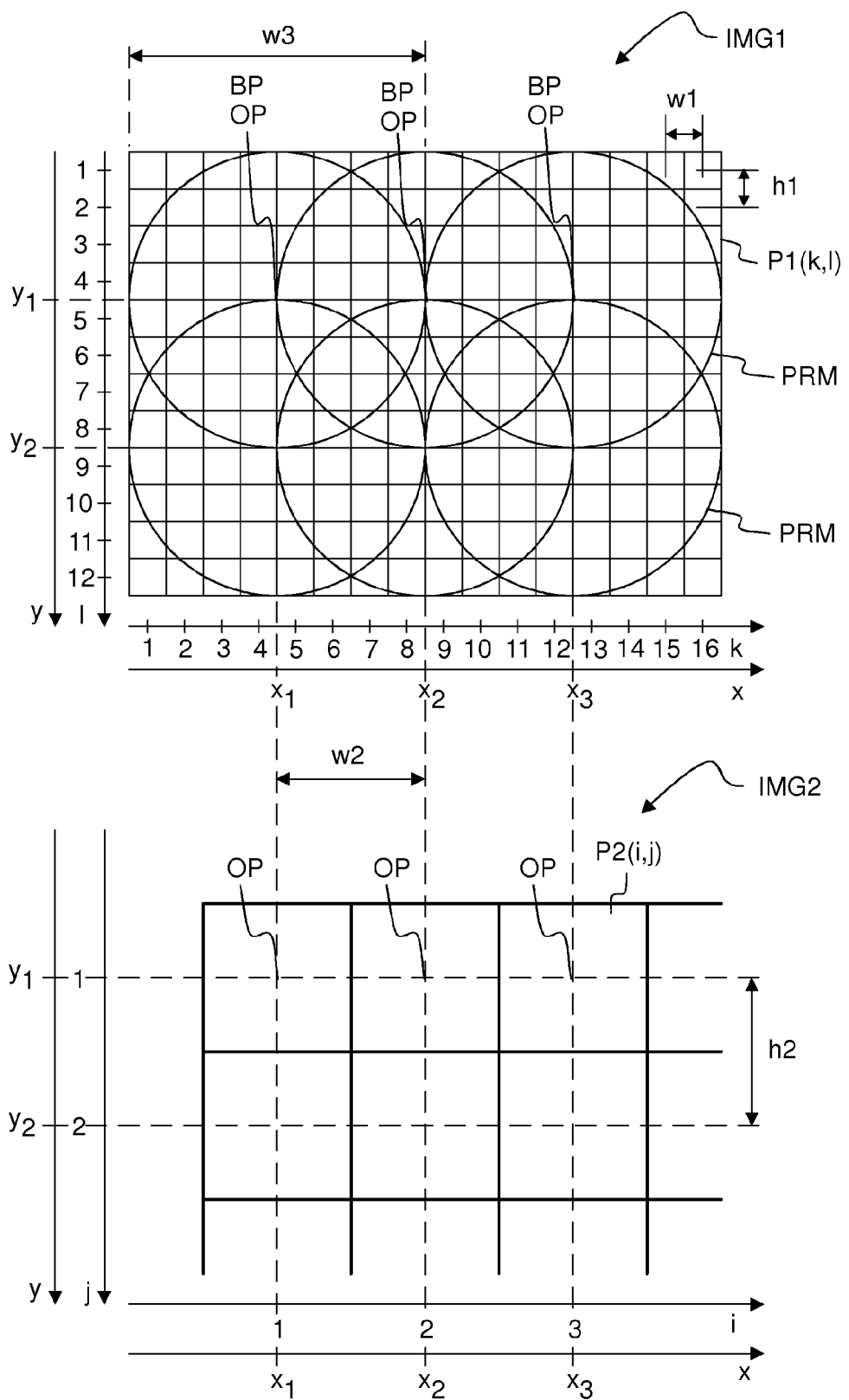

The position of the center of each element E(m,n) may be indicated by an index m, which indicates the horizontal position of the center of said element E(m,n), and by an index n, which indicates the vertical position of the center of said element E(m,n). m and n are integers. The position of the center of each element E(m,n) may also be indicated by a horizontal coordinate u and a vertical coordinate v. The coordinates u and v do not need to be integers.

w1 denotes the horizontal distance between the centers of adjacent elements E(m,n). h1 denotes the vertical distance between the centers of adjacent elements E(m,n). w1 also denotes the horizontal distance between the centers of adjacent pixels of the input image IMG1. h1 also denotes the vertical distance between the centers of adjacent pixels P1(k, l) of the input image IMG1 (see FIG. 5).

w1 and h1 may be handled in a dimensionless form, For example, it may be assumed that w1=1, and h1=1.

The distance R(m,n) of an element E(m,n) from the base point BP may be calculated as:

$$R(m,n) = \sqrt{u_m^2 + v_n^2} \tag{1}$$

An equation for a paraboloid reference surface REFS is:

$$z(u, v) = z_{max}\left(1 - \frac{4(u - u_c)^2}{(w3)^2} - \frac{4(v - v_c)^2}{(h3)^2}\right) \tag{2}$$

where $u_c$ and $v_c$ denote the coordinates of the base point BP. $z(u,v)$ denotes the value of the reference surface REFS corresponding to the coordinates u and v. $z_{max}$ denotes the maximum value of the reference surface REFS attained at the centerline.

The values of corresponding elements of the filter array FA1 are given by the equation:

$$E(m, n) = z_{max}\left(1 - \frac{4u_m^2}{(w3)^2} - \frac{4v_n^2}{(h3)^2}\right) \tag{3}$$

Negative values of E(m,n) are replaced by zero.

If desired, the values of the elements E(m,n) may be e.g. rounded or truncated to integer values in order to facilitate calculations. If desired, the values of all elements E(m,n) may be multiplied by a common multiplier prior to rounding or truncation e.g. in order to reduce rounding errors.

A non-circular elliptical perimeter PRM may be applied in order to provide a horizontal scaling factor which is different from a vertical scaling factor.

When the perimeter PRM is circular, the maximum radius RMAX is given by:

$$RMAX = \frac{w3}{2} \tag{4}$$

In case of a circular perimeter, h3=w3, and the equation for a paraboloid reference surface REFS is:

$$z(u, v) = z_{max}\left(1 - \frac{4(u - u_c)^2}{(w3)^2} - \frac{4(v - v_c)^2}{(w3)^2}\right) \tag{5}$$

The values of corresponding elements of the filter array FA1 are given by the equation:

$$E(m, n) = z_{max}\left(1 - \frac{4u_m^2}{(w3)^2} - \frac{4v_n^2}{(w3)^2}\right) \tag{6}$$

For simplicity, we may assume that the values on the u-axis are dimensionless and coincide with the values on the m-axis, and that the values on the v-axis are dimensionless and coincide with the values on the n-axis. If we choose that the position of the base point BP is $u_c$=4.5 and $v_c$=4.5, and if we choose that w3=9.2 and h3=9.2, then equation (6) may be expressed in the form:

$$E(m, n) = 10.6 \cdot \left(1 - \frac{4(m - 4.5)^2}{(9.2)^2} - \frac{4(n - 4.5)^2}{(9.2)^2}\right) \tag{7}$$

Figures 4A, 4B:
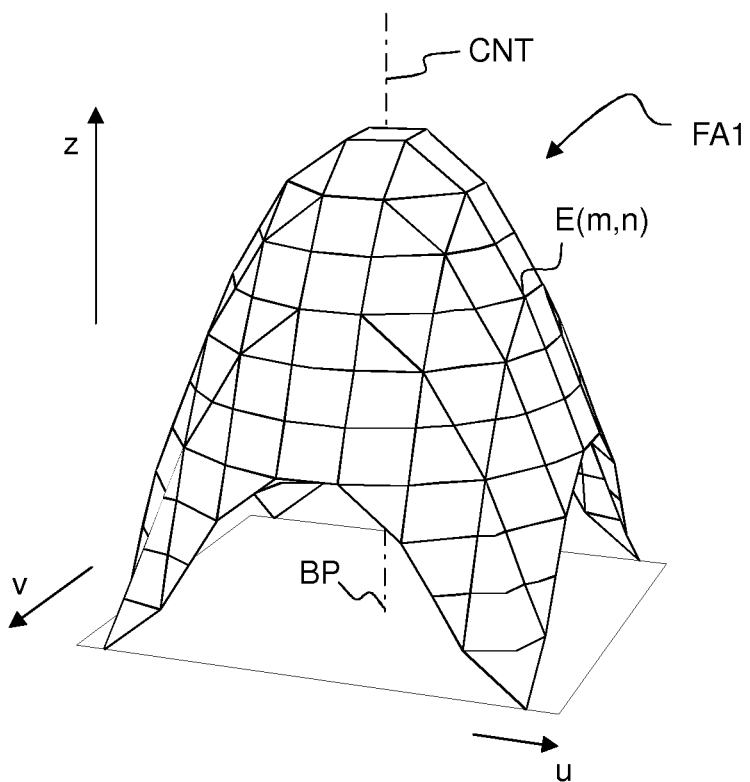
FIG. 4a shows elements of a 8×8 filter array.
FIG. 4b shows, in a three-dimensional view, the values of the elements of the 8×8 filter array of FIG. 4a, FIG. 5 shows dividing the horizontal and vertical pixel density of an input image by an integer scaling factor.

FIG. 4a shows the filter array FA1 given by eq. (7).

FIG. 4b is a three-dimensional visualization of the filter array FA1 of FIG. 4a. The values of the elements E(m,n) approximate a paraboloid reference surface REFS.

FIG. 5 shows processing of an input image IMG1 by a filter array FA1, e.g. by the filter array of FIG. 4a.

An output image IMG2 may also be provided by convolving the input image IMG1 with a filter array FFA obtained by flipping the filter array FA1 vertically and horizontally.

The input image IMG1 consists of input pixels P1(k,l). The symbol k indicates the index of a column, and the symbol l indicates the index of a row. k and l may be integers.

The output image IMG2 consists of output pixels P2(i,j). The symbol i indicates the index of a column, and the symbol j indicates the index of a row. i and j may be integers.

Also simplified notations P1, P2 and E are used herein instead of P1(k,l), P2(i,j), and E(m,n).

w2 denotes the horizontal distance between the centers of adjacent output pixels P2(i,j). h2 denotes the vertical distance between the centers of adjacent output pixels P2(i,j).

$CF_H$ denotes horizontal scaling factor. w2=$CF_H$·w1. $CF_V$ denotes vertical scaling factor. h2=$CF_V$·h1. In other words, $CF_H$=w2/w1, and $CF_V$=h2/h1. Image resolution may be reduced e.g. by applying a horizontal scaling factor $CF_H$ greater than 1 and/or by applying a vertical scaling factor $CF_V$ greater than 1.

The input image IMG1 may depict an object, e.g. a landscape, a human face, or an animal. The output image IMG2 depicts the same object using less memory space, and typically at a lower resolution.

The concept of the scaling factor becomes meaningful when the dimension w1 of the input image IMG1 is commensurate with the dimension w2 of the output image IMG2, and when the dimension h1 of the input image IMG1 is commensurate with the dimension h2 of the output image IMG2. The images IMG1, IMG2 may be stored in different memory units as bytes. It may even be so that the downscaling is made on the fly, and all pixels of the input image IMG1 do not exist simultaneously. However, the dimensions w1 and w2 become commensurate when both images IMG1, IMG2 are interpreted as complete graphical images, and the output image IMG2 is superimposed on the input image IMG1 such that the features of an imaged object appearing in the output image IMG2 coincide with the features of said imaged object appearing in the input image IMG1. For example, the object may be a human face, and the output image IMG2 may be superimposed on an input image IMG1 such that the left eye of the human face appearing in the output image IMG2 coincides with the left eye of the human face appearing in the input image IMG1, and the right eye of the face appearing in the output image IMG2 coincides with the right eye in the input image IMG1.

The horizontal scaling factor $CF_H$ may also be understood to be ratio of the number of columns of the input image IMG1 to the number of columns of the output image IMG2. The vertical scaling factor $CF_V$ may also be understood to be ratio of the number of rows of the input image IMG1 to the number of rows of the output image IMG2. The total number of pixels may be divided by a factor which is equal to the product $CF_H \cdot CF_V$.

In case of the example shown in FIG. 5, both horizontal scaling factor $CF_H$ and the vertical scaling factor $CF_V$ are equal to four. If the input image IMG1 is e.g. an array of 1024×512 pixels P1, the corresponding output image IMG2 may be an array of 256×128 pixels. Thus, the total number of pixels P2 of the output image IMG2 may be e.g. only 6.3% of the number of pixels of the input image IMG1.

The output image IMG2 may also be calculated as a two-dimensional digital convolution of the input image IMG1 and the flipped filter array FFA. When the horizontal scaling factor $CF_H$ and the vertical scaling factor $CF_V$ are integers, then the value of each output pixel $P2(i,j)$ may be calculated by the equations:

$$P2(i, j) = \sum_{\substack{m=1 \\ n=1}}^{\substack{N_{max} \\ M_{max}}} P1((k'-m, l'-n)E(m, n)) \quad (8a)$$

where $$k' = (i-1)CF_H + M_{max} + 1 \quad (8b)$$

and $$l' = (j-1)CF_V + N_{max} + 1 \quad (8c)$$

P1(first argument, second argument) denotes a function which gives the value of the input pixel at the column indicated by the first argument and the row indicated by the second argument. $M_{max}$ denotes the number of columns of the filter array FA1. $N_{max}$ denotes the number of rows of the filter array FA1.

The value of an output pixel $P2(i,j)$ of the output image IMG2 may also be calculated by performing a sum-of-products operation between the elements of the filter array FA1 and corresponding pixels P1 of the input image IMG1, e.g. by the equations:

$$P2(i, j) = \sum_{\substack{m=1 \\ n=1}}^{\substack{N_{max} \\ M_{max}}} P1(k, l)E(m, n) \quad (9a)$$

where $$k = (i-1)CF_H + m \quad (9b)$$

and $$l = (j-1)CF_V + n \quad (9c)$$

In other words, the value of an output pixel $P2(i,j)$ of the output image IMG2 may be calculated by:
  determining a location OP of an output pixel P2 with respect to the input image IMG1,
  determining values of elements (E) of a filter array (FA1) such that non-zero values of the elements (E) of said filter array (FA1) approximate a paraboloid reference surface (REFS), wherein said reference surface (REFS) has a maximum at a base point (BP), and
  determining the value of said output pixel P2 by performing a sum-of-products operation between non-zero values of the elements E of said filter array FA1 and the values of input pixels P1 of the input image IMG1 located at respective positions, when the filter array FA1 is superimposed on the input image IMG1 such that the location of the base point BP corresponds to the location of said output pixel P2.

In particular, the filter array FA1 may be superimposed on the input image IMG1 such that the location of the base point BP is in the vicinity of the location of said output pixel P2. In the context, the expression "in the vicinity" may mean e.g. that the horizontal and/or vertical distance between said base point BP and the location of the output pixel P2 may be smaller than 0.5 times the horizontal distance w1 between adjacent input pixels P1 and/or smaller than 0.5 times the vertical distance h1 between adjacent input pixels P1. Advantageously, the horizontal and/or vertical distance between said base point BP and the location of the output pixel P2 may be smaller than 0.25 times the horizontal distance w1 between adjacent input pixels P1 and/or smaller than 0.25 times the vertical distance h1 between adjacent input pixels P1.

When performing said sum-of-products operation, the filter array FA1 is positioned such that the base point BP is in the vicinity of the output pixel P2, and such that locations of the elements E coincide with locations of the pixels P1 of the input image IMG1. Each value of an element E is multiplied by the value of an input pixel P1 coinciding with the location of said element E.

Spatial frequencies may be preserved best when the filter array FA1 is superimposed on the input image IMG1 such that the centerline CNT of the reference surface REFS corresponding to said filter array FA1 coincides with the center of the output pixel $P2(i,j)$, which is being determined. Consequently, also the base point BP of the filter array FA1 coincides with the center of the output pixel $P2(i,j)$.

The center of the reference surface REFS and the base point BP of the filter array represent the location of maximum weight. The value of each output pixel $P2(i,j)$ may represent a weighted sum of input pixels $P1(k,l)$, wherein maximum weight may be given to an input pixel or pixels $P1(k,l)$ which is closest to the center OP of said output pixel $P2(i,j)$.

The symbol OP is used herein to refer to a location of an output pixel P2 with respect the input image IMG1 and/or to refer to the center point of an output pixel P2. Furthermore, the symbol OP may also denote an output point having a predetermined location with respect to the input image IMG1. Performing the sum-of-products operation provides the value of an output pixel P2 associated with said output point.

x1, x2, x3 denote horizontal coordinates of the centers OP of the output pixels $P2(i,j)$. y1 and y2 denote vertical coordinates of the centers OP of the output pixels $P2(i,j)$.

In principle, the locations OP of the output pixels P2 with respect to the input image IMG1 could also be associated e.g. with the upper left corners of the output pixels P2, instead of the center points. Also in that case, the locations of the base points BP may be determined such that the locations of the base points BP correspond to the locations of the output pixels P2. In particular, the base points BP may be in the vicinity of the centers of the output pixels P2 wherein the locations of the output pixels are at the upper left corners of the output pixels P2.

FIG. 5 shows that a first base point BP of a filter array FA1 may be selected such that at least a few input pixels P1 on the uppermost row and on the leftmost column may contribute to the value of the corresponding output pixel P2, wherein the elements E of the filter array FA1 do not overstep the boundaries of the input image IMG1. In particular, said first base point BP may be selected such that it has a horizontal coordinate x1=w3/2, and a vertical coordinate y1=h3/2 with respect to the upper left corner of the input image IMG1.

In FIG. 5, the width w3=8.0 and the height h3=8.0. If the origin of the x-axis and the y-axis is selected to be at the upper left corner of the input image IMG1, then the center of an input pixel P1 at the upper left corner of the input image IMG1 may have a horizontal coordinate x=0.5, and a vertical coordinate y=0.5. The first base point BP shown in FIG. 5 may have a horizontal coordinate x=4.0 and a vertical coordinate y=4.0. The first base point BP shown in FIG. 5 is located at the common point of the input pixels P1(m=4, n=4) and P1(m=5, n=5).

The position of the first base point BP may also be selected quite arbitrarily, i.e. it does not need to have a horizontal coordinate x1=w3/2, and/or a vertical coordinate y1=h3/2.

Once the position of the first base point BP has been selected, the locations of all the other base points BP are determined according to the selected horizontal scaling factor $CF_H$ and the according to the selected vertical scaling factor $CF_V$, i.e. according to the distances w2 and h2.

When the output image IMG2 is superimposed on the input image IMG1, the centers OP of the output pixels P2 coincide with the base points BP of the filter arrays FA1, which were used for calculating the values of said output pixels P2.

When determining the value of an extreme pixel of the output image IMG2 by performing the sum-of-products operation between the filter array FA1 and pixels P1 of the input image IMG1, it may happen that some elements E(m,n) overstep the boundaries of the input image IMG1. However, the sum-of-products operation may still be calculated for the extreme pixels e.g. by adding rows and/or columns of further pixels to the input image IMG1. Said further pixels may be generated e.g. by copying the values of the outermost pixels of the input image IMG1. Alternatively, special filters FA1 with a reduced number of rows and/or columns may be calculated for processing the outermost pixels of the input image IMG1.

When calculating the convolution of the input image IMG1 and the filter array FFA for extreme pixels of the output image, it may happen that some elements E(m,n) overstep the boundaries of the input image IMG1. However, the convolution may still be calculated for the extreme pixels e.g. by adding rows and/or columns of further pixels to the input image IMG1. Said further pixels may be generated e.g. by copying the values of the outermost pixels of the input image IMG1. Alternatively, special filters FA1 with a reduced number of rows and/or columns may be calculated for processing the outermost pixels of the input image IMG1.

The image input IMG1 may be a black and white or a greyscale image. In that case the output image IMG2 may be a greyscale image.

The input image IMG1 may be e.g. a co-sited RGB image, wherein each location is associated with three color values: a first value for the red component, a second value for the green component, and a third value for the blue component. Each color component may be processed separately so as to provide a co-sited output color image IMG2.

The input image IMG1 may also be a YUV-image, wherein each location is associated with a Y value which represents luminosity, a first chroma value U, and a second chroma value V. The luminosity values and the chroma values may be processed separately so as to provide a lower-resolution YUV format output image.

Figure 6:
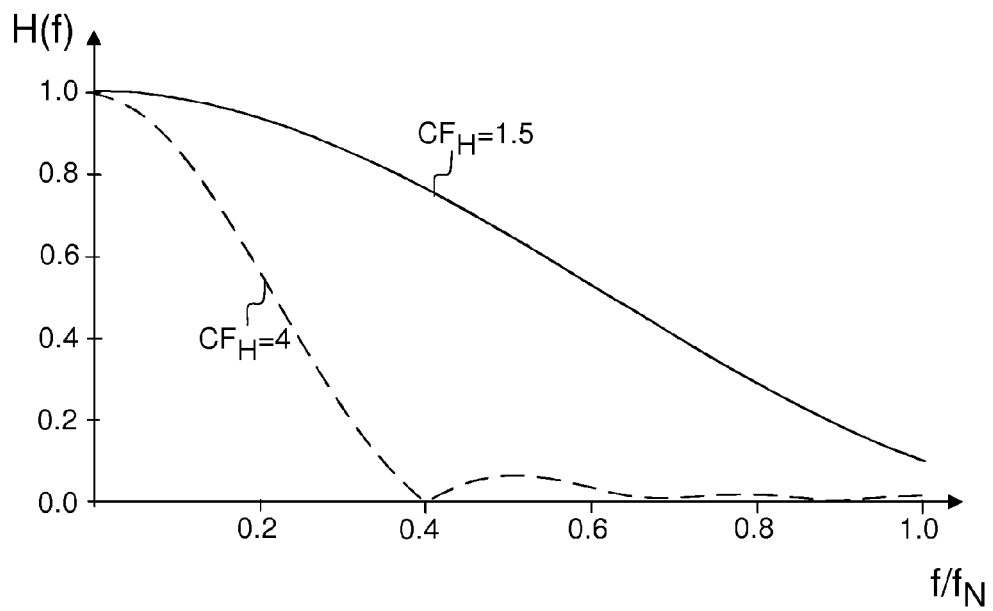
FIG. 6 shows the spatial frequency response for a 4×4 filter array when the horizontal pixel density is divided by a scaling factor of 1.5, and for a 8×8 filter array when the horizontal pixel density is divided by a scaling factor of 4.

FIG. 6 shows, by way of example, spatial frequency response H(f) for a vertical and horizontal scaling factor $CF_H$=4, by using the filter array FA1 of FIG. 4a. FIG. 6 also shows spatial frequency response H(f) for a vertical and horizontal scaling factor $CF_H$=1.5, by using filter arrays of FIG. 12.

f denotes spatial frequency of the output image IMG2 and $f_N$ denotes the Nyquist frequency, i.e. a situation where every other vertical pixel line is white and every other vertical pixel line is black.

A value H(f)=50% indicates that the maximum difference between the pixel values of bright and dark lines of the output image IMG2 is 50% of the maximum difference between the pixel values of white and black lines of the input image IMG1.

Figure 7:
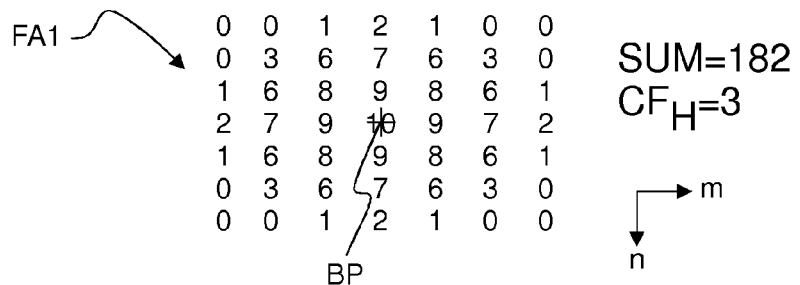
FIG. 7 shows elements of a 7×7 filter array.

FIG. 7 shows, by way of example a symmetrical 7×7 filter array FA1 suitable for implementing a horizontal and vertical scaling factor of 3. In this case the number of rows and columns is odd, and the base point BP coincides with the center of the element E(4,4).

For comparison, the base point BP of FIG. 4a coincides with the common corner of the elements E(4,4), E(5,4), E(4,5), and E(5,5).

Figure 8:
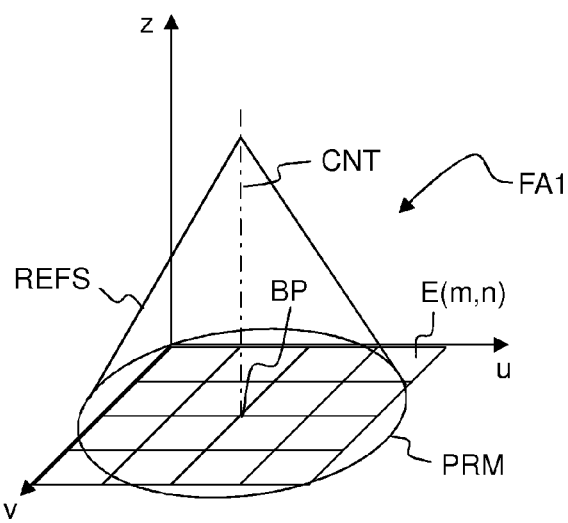
FIG. 8 shows, in a three-dimensional view, a conical reference surface superposed over the locations of the elements of a 4×4 filter array.

FIG. 8 shows a conical reference surface REFS over the locations of the elements E(m,n). The values of the elements E of a filter array may also approximate other forms than a paraboloid surface.

The elements of the filter array FA1 may approximate values given by the equation:

$$E(m, n) = z_{max}\left[1 - \frac{u_m^2}{(w3)^2} - \frac{v_n^2}{(h3)^2}\right]^q \quad (10)$$

Values outside the perimeter PRM are set to zero.

When the power q=0.5, the equation (10) gives the conical surface of FIG. 8. The power q may be e.g. in the range of 0.4 to 1.2.

An advantage associated with using a paraboloid approximation (q=1), when compared with the conical approximation (q=0.5), is that time-consuming calculation of square roots may be avoided.

Figure 9:
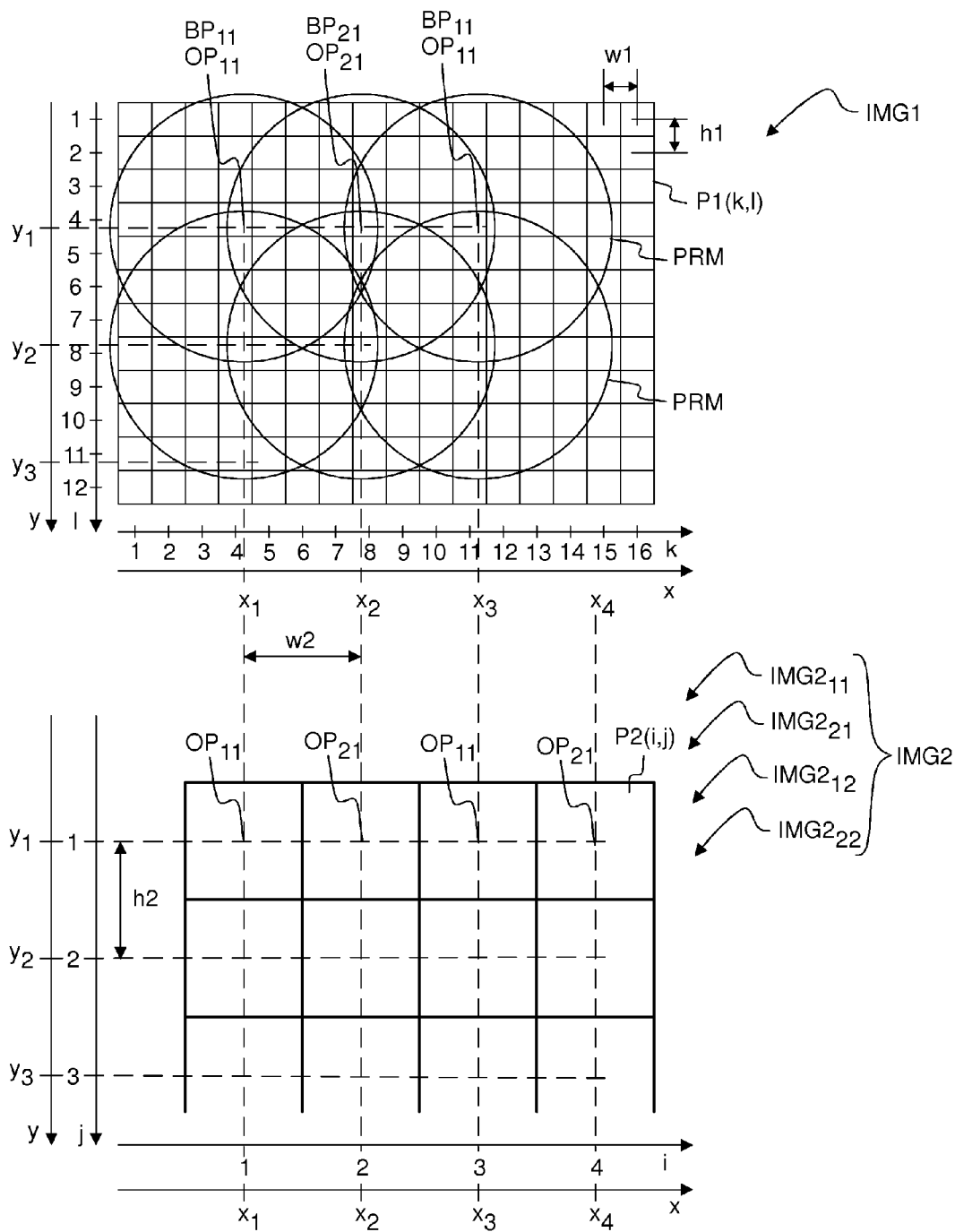
FIG. 9 shows dividing the horizontal and vertical pixel density of an input image by a scaling factor, which is not an integer.

Referring to FIG. 9, vertical scaling factor $CF_V$ and/or the horizontal scaling factor $CF_H$ may also be rational numbers which are not integers. In the case of FIG. 9, the vertical scaling factor $CF_V$ and the horizontal scaling factor $CF_H$ are both equal to 3.5. Consequently, the positions of the centers of the output pixels P2(i,j) may coincide with several different locations with respect to the centers of the input pixels P1(k,l). This means that at least a part of the output pixels P2(i,j) need to interpolated.

When the horizontal distance w2 between adjacent output pixels P2 of the output image IMG2 is not an integer multiple of the horizontal distance w1 between adjacent input pixels P1 of said input image IMG1, then the values of the output pixels P2 of the output image IMG2 may be determined by:
determining a plurality of different filter arrays $FA_{11}$, $FA_{21}$, $FA_{12}$, $FA_{22}$ corresponding to a plurality of adjacent output pixels (P2) of said output image (IMG2), and determining the value of each of said adjacent output pixels (P2) by using one of said filter arrays $FA_{11}$, $FA_{21}$, $FA_{12}$, $FA_{22}$ for performing the sum-of-products operation.

The elements E of several different filter arrays are easy to calculate according to the selected vertical scaling factor $CF_V$ and/or the selected horizontal scaling factor $CF_H$, thanks to the paraboloid approximation. The number of different filter arrays may be e.g. 4, 9, 16, or 25. The number of different filter arrays may be e.g. greater than or equal to 16. In the extreme case, the number of different filter arrays may be equal to the number of output pixels P2 of the output image IMG2. Consequently, the vertical scaling factor $CF_V$ and/or the selected horizontal scaling factor $CF_H$ may even be an irrational number. Thus, the use of filter arrays according to the present invention may provide maximum freedom to choose the vertical scaling factor $CF_V$ and/or the horizontal scaling factor $CF_H$.

The values of the output pixels P2(i,j) may also be understood to be determined by calculating convolutions of the input image IMG1 with several different flipped filter arrays FFA. The convolutions may provide a plurality of sub-images $IMG2_{11}$, $IMG2_{21}$, $IMG2_{12}$, $IMG2_{22}$ which may be slightly shifted with respect to each other. The locations of some pixels of said sub-images coincide with the desired locations of the output pixels P2, wherein the locations of some other pixels of said intermediate images do not coincide with the desired locations of the output pixels P2. The coinciding pixels provide the desired values of the output pixels P2 of the output image IMG2. Non-coinciding pixels may be discarded. A convolution algorithm may be arranged to omit the calculation for the non-coinciding pixels.

Figure 10:
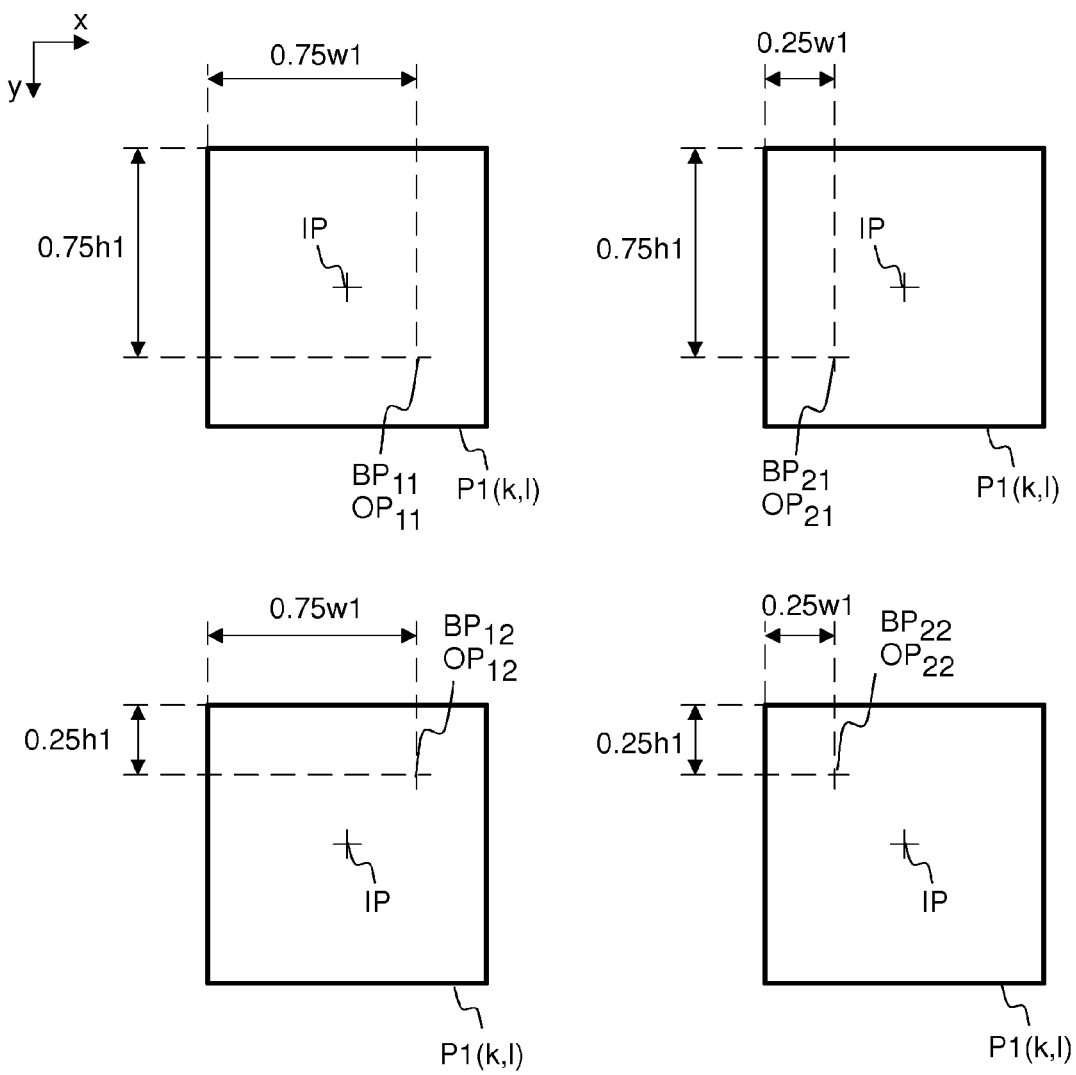
FIG. 10 shows different locations of the base points of filter arrays with respect to input pixels.

FIG. 10 shows four possible locations $BP_{11}$, $BP_{21}$, $BP_{12}$, $BP_{22}$ of a base point of a filter array with respect to the upper left corner of an input pixel P1(k,l). An output pixel P2 having a center point $OP_{11}$ may be provided by applying a filter array, which has a base point $BP_{11}$. Output pixels P2 having center points $OP_{21}$, $OP_{12}$, $OP_{22}$ may be provided by applying filter arrays with the base points $BP_{21}$, $BP_{12}$, $BP_{22}$, respectively. The output image IMG2 may be superimposed on the input image IMG1 such that the center point $OP_{11}$ coincides with the base point $BP_{11}$, and the center points $OP_{21}$, $OP_{12}$, $OP_{22}$ coincide with the base points $BP_{21}$, $BP_{12}$, $BP_{22}$, respectively.

IP denotes the center of each input pixel P1. When performing the sum-of-products operation, the filter array is superimposed on the input image IMG1 such that the centers of the elements E of the filter array coincide with the centers IP of the input pixels P1.

Thus, in this case, also the base points $BP_{11}$, $BP_{21}$, $BP_{12}$, $BP_{22}$ have four different locations with respect to the elements E of the filter arrays. Each different location of a base point is associated with a different filter array FA1.

Several different filter arrays may be determined (See FIG. 12) in order to calculate the values of output pixels P2(i,j) at different locations $OP_{11}$, $OP_{21}$, $OP_{12}$, $OP_{22}$. For example, a filter array $FA_{12}$ (FIG. 12) having a base point $BP_{12}$ may be applied to calculate the value of an output pixel P2(i,j) whose center is at the position $OP_{12}$.

Figure 11:
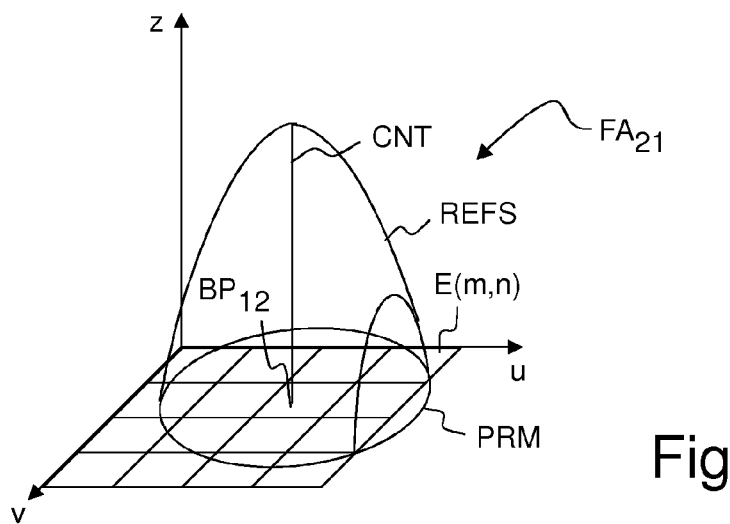
FIG. 11 shows, in a three-dimensional view, an asymmetrical position of the base point of a filter array with respect to the elements of said filter array.

Referring to FIG. 11, the values of the elements E(m,n) may approximate values of a paraboloid reference surface REFS so that the centerline CNT of said reference surface REFS is positioned asymmetrically with respect to the locations of the elements of the filter array $FA_{21}$.

It may be noticed that the locations $OP_{11}$, $OP_{21}$, $OP_{12}$, $OP_{22}$ are shifted horizontally and vertically by a quarter pixel with respect to the centers of the input pixels P1(k,l). The base points $BP_{11}$, $BP_{21}$, $BP_{12}$, $BP_{22}$ may also be shifted by a quarter pixel with respect to the centers of the elements E(m, n) of the filter arrays, respectively.

Figure 12:
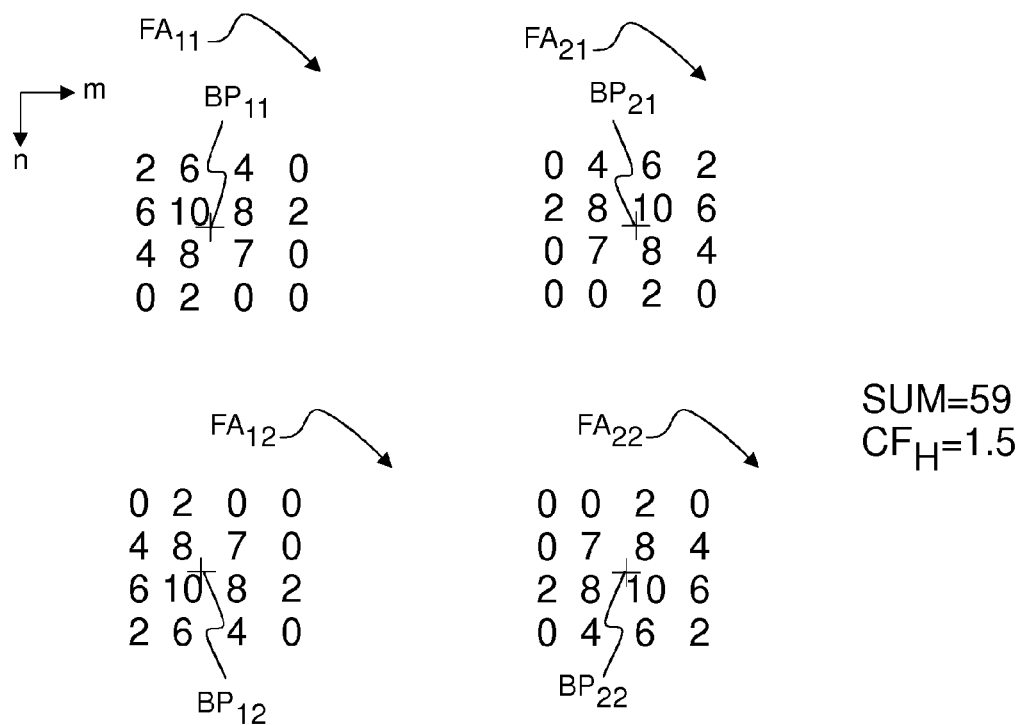
FIG. 12 shows a group of 4×4 filter arrays for dividing the horizontal pixel density by a scaling factor of 1.5 and for dividing the vertical pixel density by a scaling factor of 1.5.

FIG. 12 shows four filter arrays $FA_{11}$, $FA_{21}$, $FA_{12}$, $FA_{22}$ for providing a vertical scaling factor $CF_V$=1.5 and a horizontal scaling factor $CF_H$=1.5. These filter arrays are suitable for providing a co-sited output image IMG2.

Figure 13:
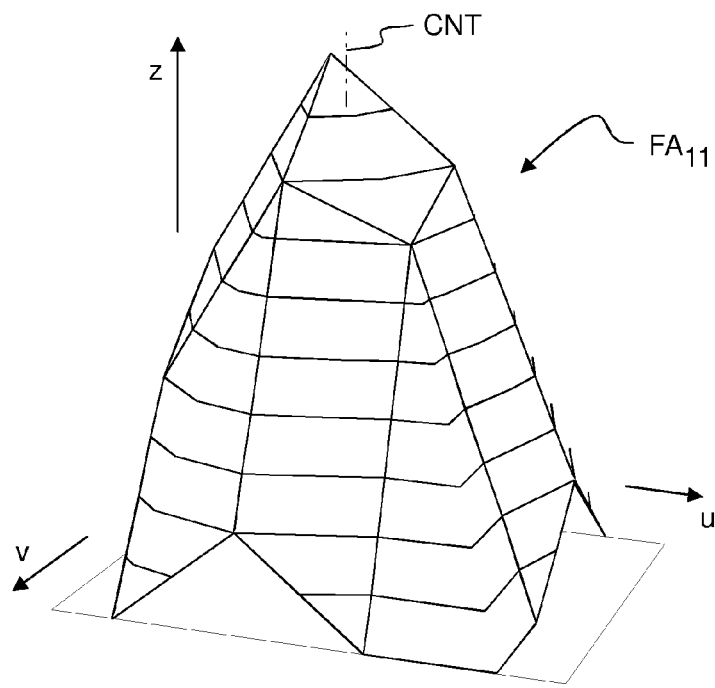
FIG. 13 shows, in a three-dimensional view, the values of the elements of an asymmetrical 4×4 filter array of FIG. 12.

FIG. 13 is a three-dimensional visualization of the filter array $FA_{11}$ of FIG. 12.

Figures 14, 15:
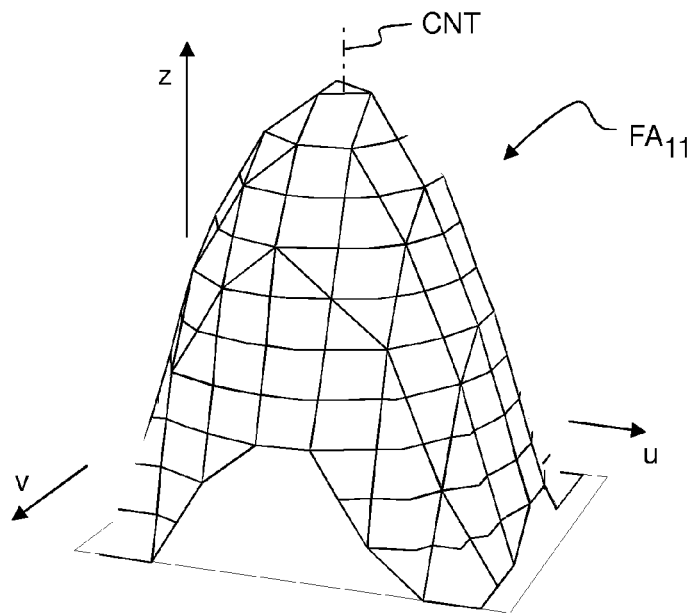
FIG. 14 shows a group of 8×8 filter arrays for dividing the horizontal pixel density by a scaling factor of 4 and for dividing the vertical pixel density by a scaling factor of 4.
FIG. 15 shows, in a three-dimensional view, the values of the elements of an asymmetrical 8×8 filter array of FIG. 14.

FIG. 14 shows four different filter arrays $FA_{11}$, $FA_{21}$, $FA_{12}$, $FA_{22}$ for providing a vertical scaling factor $CF_V$=3.5 and a horizontal scaling factor $CF_H$=3.5. The output image IMG2 may be determined by performing sum-of-product operations by using the filter arrays $FA_{11}$, $FA_{21}$, $FA_{12}$, $FA_{22}$.

FIG. 15 is a three-dimensional visualization of the filter array $FA_{11}$ of FIG. 14. These filter arrays are suitable for providing a co-sited output image IMG2.

The output image IMG2 may also be determined by calculating convolutions with filter arrays $FFA_{11}$, $FFA_{12}$, $FFA_{21}$, and $FFA_{22}$.

$FFA_{11}$ denotes a filter array obtained by flipping the filter array $FA_{22}$ of FIG. 12 vertically and horizontally, $FFA_{12}$ denotes a filter array obtained by flipping the filter array $FA_{21}$ of FIG. 12 vertically and horizontally, $FFA_{21}$ denotes a filter array obtained by flipping the filter array $FA_{12}$ of FIG. 12 vertically and horizontally, and $FFA_{22}$ denotes a filter array obtained by flipping the filter array $FA_{11}$ of FIG. 12 vertically and horizontally.

Referring back to FIGS. 9 and 10, the convolution of the filter array $FFA_{11}$ and the input image IMG1 may be calculated only for those output pixels P2(i,j) where the position of the center of the output pixel P2(i,j) coincides with the lower right portion of an input pixel P1(k,l). Convolution with the filter array $FFA_{11}$ provides a sub-image $IMG2_{11}$.

The convolution of the filter array $FFA_{21}$ and the input image IMG1 may be calculated only for those output pixels P2(i,j) where the position of the center of the output pixel P2(i,j) coincides with the lower left portion of an input pixel P1(k,l). Convolution with the filter array $FFA_{21}$ provides a sub-image $IMG2_{21}$.

The convolution of the filter array $FFA_{12}$ and the input image IMG1 may be calculated only for those output pixels P2(i,j) where the position of the center of the output pixel P2(i,j) coincides with the upper right portion of an input pixel P1(k,l). Convolution with the filter array $FFA_{11}$ provides a sub-image $IMG2_{12}$.

The convolution of the filter array $FFA_{22}$ and the input image IMG1 may be calculated only for those output pixels P2(i,j) where the position of the center of the output pixel P2(i,j) coincides with the upper left portion of an input pixel P1(k,l). Convolution with the filter array $FFA_{22}$ provides a sub-image $IMG2_{22}$.

In this case each convolution provides approximately only 25% of the output pixels P2(i,j). These four convolutions provide together four interlaced sub-images $IMG2_{11}$, $IMG2_{21}$, $IMG2_{12}$, $IMG2_{22}$, which may be combined so as to form a complete output image IMG2.

Figure 16:
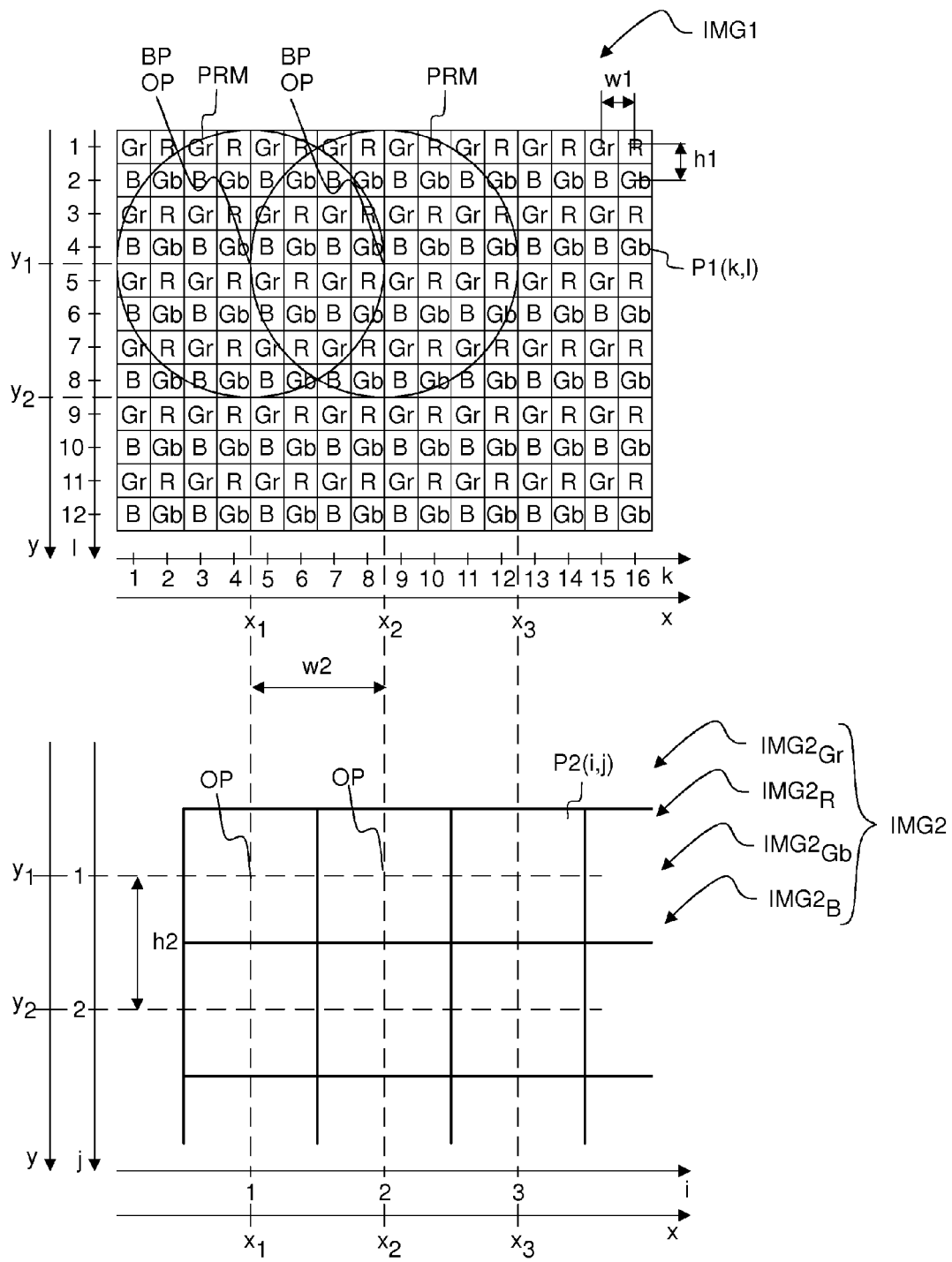
FIG. 16 shows reducing the pixel density of a Bayer format input image

FIG. 16 shows compressing of the image data of a Bayer format input image IMG1. The pixels of the input image may be understood to be arranged as 2×2 arrays or patterns, wherein each pattern consists of two green pixels Gr, Gb, a red pixel R, and a blue pixel B.

The input image IMG1 may be provided e.g. by performing the sum-of-products operations separately for each color R, Gr, Gb, and B, by using different color-specific filter arrays $FA_{Gr}$, $FA_R$, $FA_B$, $FA_{Gb}$.

Also the output image IMG2 may comprise red, green, and blue pixels. The pixels may be interlaced and arranged according to the Bayer pattern so as to form a Bayer format output image IMG2. The positions of the pixels P2(i,j) of the output sub-images IMG2$_{GR}$, IMG2$_R$, IMG2$_{Gb}$, IMG$_B$ may also coincide, i.e. the pixels of the output image IMG2 may be co-sited.

The value of e.g. a red output pixel P2 of the output image IMG2 may be determined by
  superimposing a color-specific filter array FA$_R$ on said input image IMG1 such that the location of the base point BP of said filter array FA$_R$ corresponds to the location of said red output pixel P2 of said output image IMG2, and
  performing the sum-of-products operation between the elements E of said color-specific filter array FA$_R$ and red pixels P1 of the input image IMG1 located at respective positions.

The sum-of-products operations may provide four different output sub-images IMG2$_{GR}$, IMG2$_R$, IMG2$_{Gb}$, IMG2$_B$ associated with the different color components The output sub-images IMG2$_{GR}$, IMG2$_R$, IMG2$_{Gb}$, IMG2$_B$ may be combined to together form an output image IMG2.

The input image IMG1 may also be understood to be provided e.g. by calculating a convolution between the input image IMG1 and a color-specific filter array for each color component of the Bayer pattern. These convolutions may provide four output sub-images IMG2$_{GR}$, IMG2$_R$, IMG2$_{Gb}$, IMG2$_B$. The output sub-images IMG2$_{GR}$, IMG2$_R$, IMG2$_{Gb}$, IMG2$_B$ may be combined to together form an output image IMG2.

Figures 17, 18:
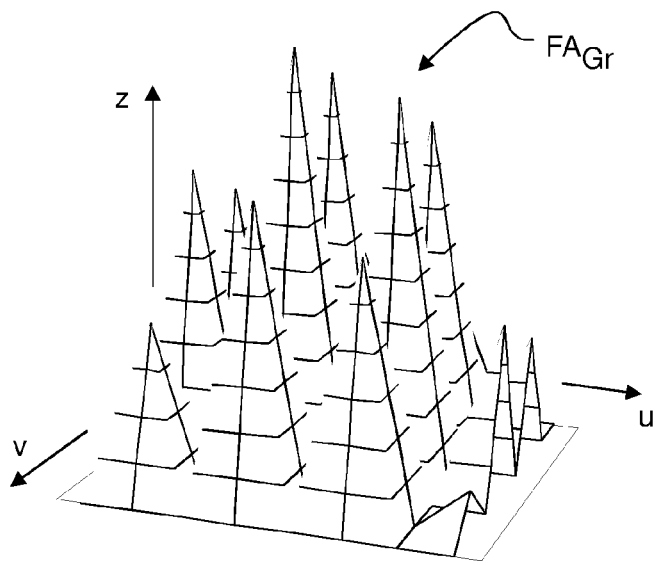
FIG. 17 shows a group of 8×8 filter arrays for converting a Bayer format input image into a co-sited output image having a reduced pixel density.
FIG. 18 shows, in a three-dimensional view, the values of the elements of a 8×8 filter array of FIG. 17.

FIG. 17 shows filter arrays FA$_{Gr}$, FA$_R$, FA$_B$, FA$_{Gb}$ for providing a co-sited output color image IMG2.

The values of the green Gr pixels of the output image IMG2 may be determined by performing a sum-of-products operation between the elements E of the color-specific filter array FA$_{Gr}$ and the pixels P1 of the input image IMG1 located at respective positions.

The values of the red pixels of the output image IMG2 may be determined by performing a sum-of-products operation between the elements E of the color-specific filter array FA$_R$ and the pixels P1 of the input image IMG1 located at respective positions.

The values of the green Gb pixels of the output image IMG2 may be determined by performing a sum-of-products operation between the elements E of the color-specific filter array FA$_{Gb}$ and the pixels P1 of the input image IMG1 located at respective positions.

The values of the blue pixels of the output image IMG2 may be determined by performing a sum-of-products operation between the elements E of the color-specific filter array FA$_B$ and the pixels P1 of the input image IMG1 located at respective positions.

The filter arrays of FIG. 17 are suitable for a horizontal scaling factor CF$_H$=4 and a vertical scaling factor CF$_V$=4.

Also in this case, w1 denotes the horizontal distance between adjacent pixels P1 of the input image IMG1, and h1 denotes the vertical distance between adjacent pixels P1 of the input image IMG1.

The filter array FA$_{Gr}$ may comprise rows and/or columns of zero elements R(m,n) so as to eliminate the effect of R, B, and Gb components. A filter array FA$_{Gr}$, FA$_R$, FA$_B$, FA$_{Gb}$ for processing a specific color component may comprise rows and/or columns of zero elements R(m,n) so as to eliminate the effect of the other color components.

The values of positive elements E(m,n) of the filter arrays FA$_{Gr}$, FA$_R$, FA$_B$, FA$_{Gb}$ may approximate a paraboloid reference surface REFS. When providing a co-sited output image IMG2, the centerline CNT of said reference surface REFS may be e.g. at the center of a 8×8 array of elements, i.e. at the common corner of the elements E(4,4), E(5,4), E(4,5), and E(5,5).

FIG. 18 is a three-dimensional visualization of the filter array FA$_{Gr}$. Non-zero values of the elements E(m,n) approximate a paraboloid reference surface REFS.

Figures 19A, 19B, 19C, 20:
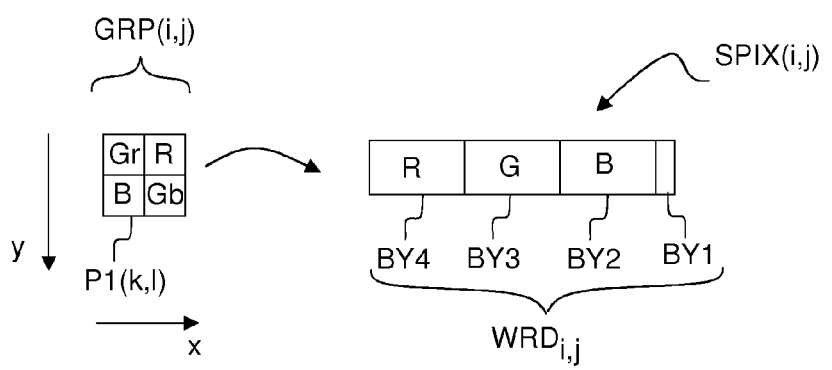
FIG. 19a shows a 8×8 filter array for processing the red pixels of a Bayer format input image.
FIG. 19b shows a 8×8 filter array for processing the green pixels of a Bayer format input image by combining the pixels Gr and Gb.
FIG. 19c shows a 8×8 filter array for processing the red pixels of a Bayer format input image.
FIG. 20 shows combining Gr and Gb values into a single value indicating the green color.

Referring to FIG. 19b, the green components Gb and Gr of co-sited output image IMG2 may also be combined without excessive loss of information. The components Gb and Gr may be combined e.g. by calculating the sum or average value of coinciding output pixels Gb and Gr. This operation may be performed already when performing the sum-of-products operations by using a filter array FA$_G$ of FIG. 19b. The elements E(m,n) of the filter array FA$_G$ take into account the contribution of the Gb and Gr pixels of a Bayer format input image IMG1. The filter array FA$_G$ may comprise interlaced zero elements E(m,n) so as to eliminate the effect of red and blue input pixels.

FIG. 19a shows a filter array FA$_R$ for calculating the red pixels of the output image IMG2. FIG. 19c shows a filter array FA$_B$ for calculating the blue pixels of the output image IMG2. The green, red and blue sub-images calculated by using the filter arrays of FIGS. 19a-19c may be combined so as to form a co-sited RGB output image IMG2.

The values of positive elements E(m,n) of the filter arrays FA$_G$, FA$_R$, and FA$_B$, may approximate a paraboloid reference surface REFS. When providing a co-sited output image IMG2, the centerline CNT of said reference surface REFS may be e.g. at the center of a 8×8 array of elements, i.e. at the common point of the elements E(4,4), E(5,4), E(4,5), and E(5,5).

It is typically desirable that equal weight is given to the color components Gr and Gb. For example, in case of the filter array FA$_G$ according to FIG. 19b, the sum of elements E coinciding with Gr pixels of the input image IMG1 may be equal to the sum of elements E coinciding with the Gb pixels of the input image IMG1. Consequently, an input image portion having uniform brightness may provide an output image portion which has uniform brightness, after performing the sum-of-products operation.

In certain cases, the input image IMG1 may also be captured by an image sensor (FIG. 27) so that the values of the red, Gr, Gb, and blue pixels provided by the image sensor are not balanced. For example, a light detector area arranged to capture the Gr value may be slightly larger than a light detector area arranged to capture the Gb value. If needed, the Gr and Gb values may be balanced prior to the sum-of-products operation with the filter arrays FA$_{Gr}$, FA$_{Gb}$ (FIG. 17) or with the filter array FA$_G$ (FIG. 19b). The filter arrays FA$_{Gr}$, FA$_{Gb}$, and/or FA$_G$ may be modified such that the sum-of-products operation simultaneously balances the different color components. For example, all elements of the filter array FA$_{Gr}$ or FA$_{Gb}$ may be multiplied by a common factor. For example, only elements of the filter array FA$_G$ associated with the Gr component may be multiplied by a common factor.

Referring to FIG. 20, a 2×2 pixel group GRP(i,j) of a Bayer format image may be converted into a co-sited pixel SPIX(i,j). The co-sited pixel SPIX(i,j) may represent the 2×2 pixel group GRP(i,j) of a said image. The pixel SPIX(i,j) may comprise a data portion BY4 which contains the value of the red pixel of said pixel group GRP(i,j). The pixel SPIX(i,j) may comprise a data portion BY3 which represents the combined values of the Gr and Gb pixels of said pixel group GRP(i,j). The pixel SPIX(i,j) may comprise a data portion BY2 which contains the value of the blue pixel of said pixel group GRP(i,j). The pixel SPIX(i,j) may comprise a further data portion to indicate e.g. a checksum. Also a simplified notation SPIX is used herein to indicate an image element instead of the notation SPIX(i,j).

Regarding other image formats, a co-sited pixel SPIX(i,j) may also be determined such that it represents a predetermined color component in a pixel group GRP(i,j) of a co-sited image, or in a pixel group GRP(i,j) of a Quasi-Bayer format image, wherein said pixel group GRP(i,j) comprises at least two pixels P1 associated with the same color component. Said pixel group GRP(i,j) may preferably comprise at least four pixels P1 associated with the same color component.

The Quasi-Bayer format has been defined in the Standard Mobile Imaging Architecture (SMIA 1.0) standard created by the companies Nokia Corporation and ST Microelectronics.

The pixel SPIX(i,j) may be stored in a memory or transmitted via a data bus as a bit string $WRD_{i,j}$.

The bit string SPIX(i,j) may comprise only one byte BY4 which contains the value of the red pixel of said pixel group GRP(i,j). The bit string SPIX(i,j) may comprise only one byte BY3 which represents the combined values of the Gr and Gb pixels of said pixel group GRP(i,j). The bit string SPIX(i,j) may comprise only one byte BY2 which contains the value of the blue pixel of said pixel group GRP(i,j). The bit string SPIX(i,j) may further comprise one or more header portions BY1 to indicate e.g. saturation of a pixel value, location of the pixel group GRP(i,j), a checksum, or the beginning of the bit string SPIX(i,j). The header portion BY1 may also be at the end of the bit string SPIX(i,j) or e.g. between the bytes BY2 and BY3. The bit string SPIX(i,j) may also be implemented without the header portion BY1. In that case the bit string SPIX(i,j) may consist of the bytes BY2, BY3, BY4. The bytes BY2, BY3, BY4 may also be in a different order, e.g. in the order BY2, BY4, BY3.

Each of the bytes BY2, BY3, BY4 represents a value of a color component. Each of the bytes BY2, BY3, BY4 may consist of e.g. 6 to 16 bits.

This conversion may provide approximately 25% bandwidth reduction.

Figure 21A:
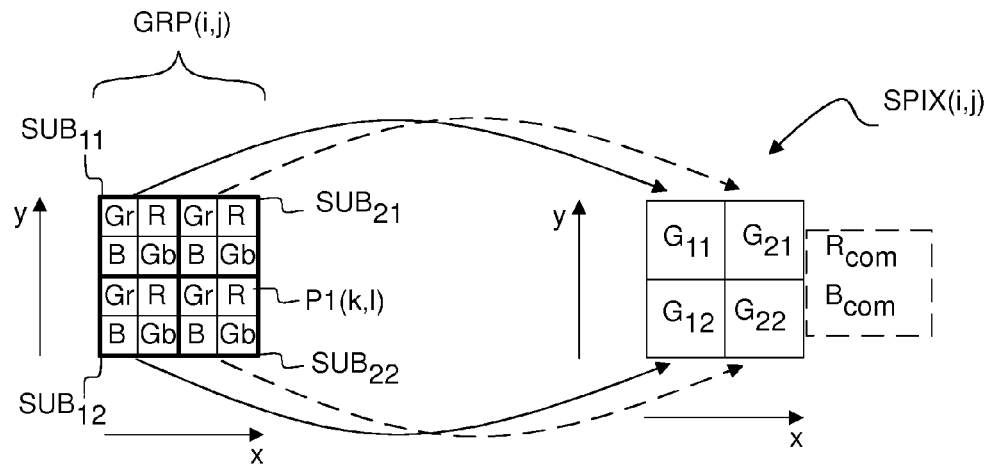
FIG. 21a shows converting 16 Bayer format pixel values into an image element comprising four values indicating the green color, a common value indicating the red color, and a common value indicating the blue color.

Referring to FIG. 21a, a 4×4 pixel group GRP(i,j) of a Bayer format image may be converted into an image element SPIX(i,j) comprising a 2×2 array of green pixels $G_{11}$, $G_{21}$, $G_{12}$, $G_{22}$ combined with a common value $R_{COM}$ for the red color and a common value $B_{COM}$ for the blue color. The pixel $G_{11}$, which is positioned on the upper left portion of the image element SPIX(i,j) may represent the contribution of green Gr and Gb pixels of a sub-group of pixels $SUB_{11}$ on the upper left quarter of said pixel group GRP(i,j). The pixel $G_{21}$, which is positioned on the upper right portion of the image element SPIX(i,j) may represent the contribution of green Gr and Gb pixels of a sub-group of pixels on the upper right quarter of said pixel group GRP(i,j). The pixel $G_{12}$, which is positioned on the lower left portion of the image element SPIX(i,j) may represent the contribution of green Gr and Gb pixels of a sub-group of pixels on the lower left quarter of said pixel group GRP(i,j). The pixel $G_{22}$, which is positioned on the lower right portion of the image element SPIX(i,j) may represent the contribution of green Gr and Gb pixels of a sub-group of pixels on the lower right quarter of said pixel group GRP(i,j).

The value of the green pixel $G_{11}$ may be calculated e.g. as a sum, as an average, or as a weighed average of the green values Gr, Gb of the sub-group SUB11. The values of the pixels $G_{21}$, $G_{12}$, $G_{22}$, may be calculated, respectively.

The common value $R_{COM}$ may be calculated e.g. as a sum, average, or weighed average of the red values of the whole group GRP(i,j). The common value $B_{COM}$ may be calculated, respectively.

In particular, the calculation of the sum, average, or weighed average may be calculated by multiplying the pixel values of the group GRP(i,j) by the corresponding values of the elements E(m,n) of a filter array.

In particular, the conversion of pixel group GRP(i,j) of an output image IMG2 into compressed image elements SPIX(i,j) may be performed by performing sum-of-products operations by using a suitable set of filter arrays. The values of positive elements E(m,n) of the filter arrays may approximate e.g. a paraboloid reference surface REFS.

The pixels SPIX(i,j) may also be determined such that each pixel SPIX(i,j) represents a predetermined color component in a pixel group GRP(i,j) of a co-sited image, or in a pixel group GRP(i,j) of a Quasi-Bayer format image.

Figure 21B:
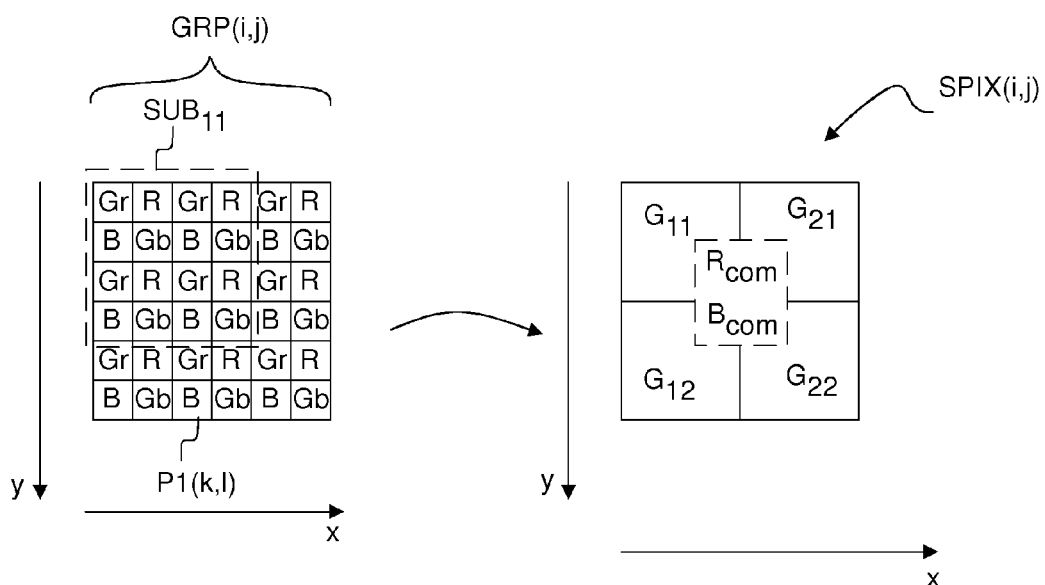
FIG. 21b shows converting more than 16 Bayer format pixel values into an image element comprising four values indicating the green color, a common value indicating the red color, and a common value indicating the blue color.

Referring to the more general case of FIG. 21b, a pixel group GRP(i,j) of a Bayer format image may comprise three or more columns and three or more rows. In particular, said pixel group GRP(i,j) may comprise five or more columns and five or more rows. The pixel group GRP(i,j) may be converted into an image element SPIX(i,j) comprising a 2×2 array of green pixels $G_{11}$, $G_{21}$, $G_{12}$, $G_{22}$ combined with a common value $R_{COM}$ for the red color and a common value $B_{COM}$ for the blue color. The pixel $G_{11}$, which is positioned on the upper left portion of the image element SPIX(i,j) may represent the contribution of green Gr and Gb pixels of a sub-group of pixels $SUB_{11}$ on the upper left portion of said pixel group GRP(i,j). The pixel $G_{21}$, which is positioned on the upper right portion of the image element SPIX(i,j) may represent the contribution of green Gr and Gb pixels of a sub-group of pixels on the upper right portion of said pixel group GRP(i,j). The pixel $G_{12}$, which is positioned on the lower left portion of the image element SPIX(i,j) may represent the contribution of green Gr and Gb pixels of a sub-group of pixels on the lower left portion of said pixel group GRP(i,j). The pixel $G_{22}$, which is positioned on the lower right portion of the image element SPIX(i,j) may represent the contribution of green Gr and Gb pixels of a sub-group of pixels on the lower right portion of said pixel group GRP(i,j). Said sub-groups may adjacent or partially overlapping. Each of said sub-groups may cover e.g. 25 to 50% of the total area of the pixel group GRP(i,j).

Figure 22:
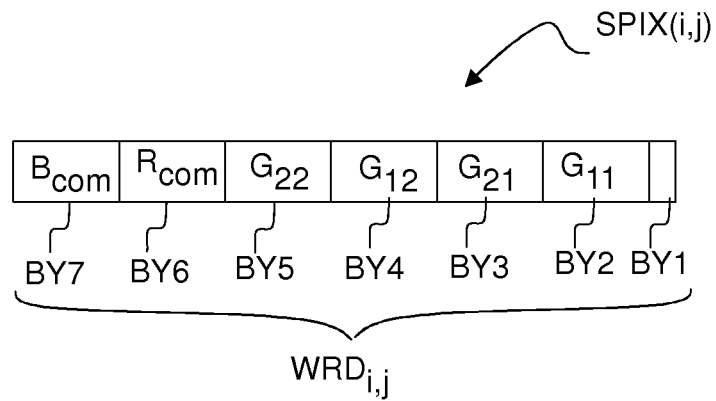
FIG. 22 shows a word comprising only four values indicating the green color, only one value indicating the red color, and only one value indicating the blue color.

Referring to FIG. 22, the image element SPIX(i,j) of FIG. 21 may be stored in a memory or transmitted via a data bus as a bit string $WRD_{i,j}$.

The bit string SPIX(i,j) may comprise only one byte BY2 which contains the value of $G_{11}$ of said image element SPIX(i,j).

The bit string SPIX(i,j) may comprise only one byte BY3 which contains the value of $G_{21}$ of said image element SPIX(i,j).

The bit string SPIX(i,j) may comprise only one byte BY4 which contains the value of $G_{12}$ of said image element SPIX(i,j).

The bit string SPIX(i,j) may comprise only one byte BY5 which contains the value of $G_{22}$ of said image element SPIX(i,j).

The bit string SPIX(i,j) may comprise only one byte BY6 which contains the value of $R_{COM}$ of said image element SPIX(i,j).

The bit string SPIX(i,j) may comprise only one byte BY7 which contains the value of $B_{COM}$ of said image element SPIX(i,j).

In addition, the bit string SPIX(i,j) may comprise one or more header portions BY1 to indicate e.g. the position of the pixel group GRP(i,j), a checksum, the beginning or end of said bit string SPIX(i,j), the saturation of a pixel value etc.

The bytes BY2, BY3, BY4, BY5, BY6, BY7 and the header portions BY1 may also be in a different order than shown in FIG. 22.

Thus, an aspect of the invention is a computer readable medium (MEM4) comprising a plurality of bit strings (SPIX) representing a digital color image (IMG1, IMG2), wherein each bit string (SPIX) in turn comprises:
- a first green byte (BY2) representing brightness of green color in an upper left portion (SUB11) of an image area (GRP) of said digital color image (IMG1, IMG2),
- a second green byte (BY3) representing brightness of green color in an upper right portion of said image area (GRP),
- a third green byte (BY4) representing brightness of green color in a lower left portion of said image area (GRP),
- a fourth green byte (BY5) representing brightness of green color in a lower right portion of said image area (GRP),
- only one red byte (BY6) representing average brightness of red color of said image area (GRP), and
- only one blue byte (BY7) representing average brightness of blue color of said image area (GRP), wherein said portions (SUB11) are not overlapping or overlap each other only partially.

Figure 23:
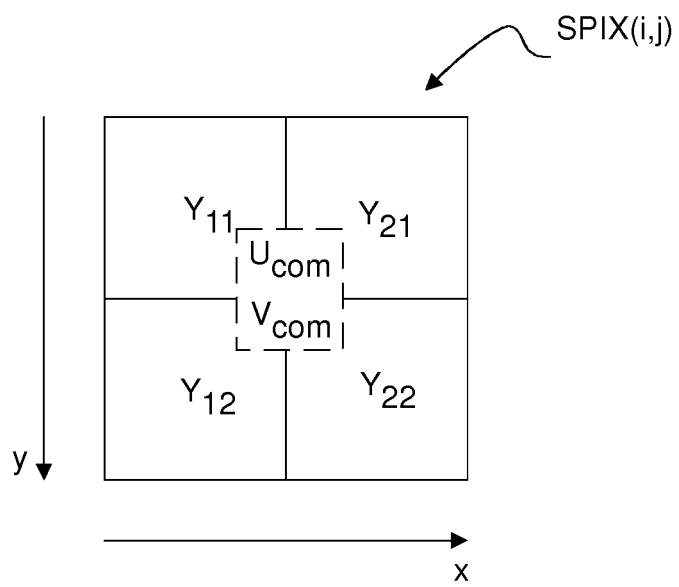
FIG. 23 shows an element of a YUV format output image, wherein common chrominance values U and V are associated with a 2×2 group of luminance values Y.

FIG. 23 shows an image element SPIX(i,j) related to a YUV format image. Y denotes herein a luminosity value. U and V denote chroma values. Four luminosity values may be associated with a common U-value and a common V-value. Y-values, U-values and/or V-values may be combined and/or interpolated by performing sum-of-products operations between suitable filter arrays and pixels of a YUV format input image IMG1.

The data conversion shown in FIGS. 21, 22, and 23 may substantially reduce the need for memory space or required bandwidth, while still preserving significant amount of spatial modulation information. In case of a 4×4 array GRP(i,j), the reduction may be e.g. from 16 bytes to only 6 bytes. This corresponds to a 63% reduction in memory size or data transmission capacity.

If desired, the number of bits of the bit string SPIX(i,j) may be further reduced e.g. by applying a DPCM/PCM compression algorithm described e.g. in WO2004/064402. DPCM/PCM compression may be used to convert e.g. a single 10-bit byte BY2 into a single 6-bit byte, or a 12-bit byte BY2 into a 8-bit byte.

DPCM is an acronym for differential pulse code modulation. PCM is an acronym for pulse code modulation.

Figure 24A:
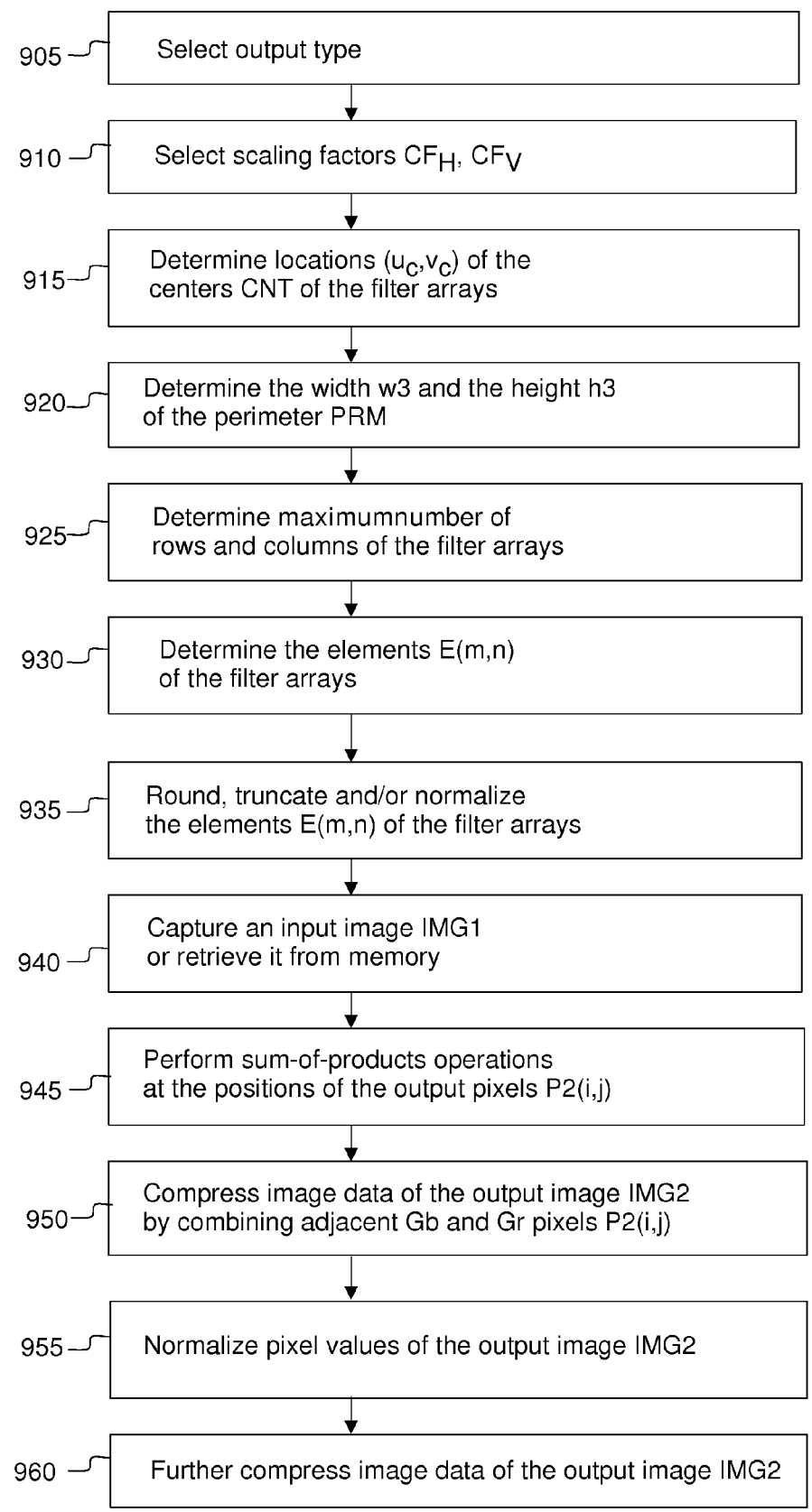
FIG. 24a shows method steps for processing an input image.

FIG. 24a is a block diagram showing method steps for processing an input image.

A user may select the output type in step 905. The desired output format may be e.g. co-sited RGB, co-sited R-Gr-Gb-B, co-sited YUV, Bayer format, or image elements SPIX(i,j) discussed with reference to FIGS. 21-23. If a predetermined output type is produced, then the step 905 may be omitted.

The user may select the desired scaling factor CF in step 910. The vertical and horizontal scaling factors $CF_V$, $CF_H$ may be equal or different. The user may also indirectly select the scaling factor by selecting the dimensions of an output image IMG or by selecting that the output image quality should be e.g. "low", "medium" or "high".

An imaging device 500 (see FIG. 25) may also be arranged to automatically determine the scaling factor CF e.g. based on available memory size.

In step 915, the location of a centerline of the reference surface REFS is determined with respect to the locations of the elements E(m,n) of a filter array FA1. It may be that the locations of the base points BP need to be determined for several different filter arrays $FA_{11}$, $FA_{21}$, $FA_{12}$, $FA_{22}$.

Locations for several base points BP may need to be determined e.g. when
- the vertical or horizontal scaling factor is not an integer,
- the input image is in the Bayer format, and/or
- the output image is in the Bayer format.

In step 920 the width w3 and the height h3 of the perimeter PRM may be determined.

The width w3 of the perimeter PRM of a filter array FA1 may be e.g. in the range of 1.8 to 3.2 times the horizontal distance w2 between the centers of pixels P2 of the output image IMG2. In particular, the width w3 may be in the range of 2 to 2√2 times w2. When h3=w3, this ensures that each pixel P1 of the input image IMG1 may contribute only up to nine output pixels P2. Consequently, it is enough if the operational memory MEM3 has space for calculating the sum-of-products for three rows (or columns) of pixels P2 of the output image IMG2.

The ratio w3/w2 may also be in the range of 1.8 to 2, but below 1.8, the spatial frequency response begins to degrade and/or aliasing of the output image IMG2 may increase.

The ratio w3/w2 may also be in the range of 2√2 to 3.2, but at that range higher spatial frequencies start to be attenuated. In addition more calculations and/or memory space may be needed.

The horizontal distance w2 between the centers of pixels P2 of the output image IMG2 is equal to the horizontal distance w1 between the centers of pixels P1 of the input image IMG1 multiplied by the horizontal scaling factor $CF_H$.

The height h3 of the perimeter PRM of a filter array FA1 may be e.g. in the range of 1.8 to 3.2 times the vertical distance h2 between the centers of pixels P2 of the output image IMG2. In particular, the height h3 may be in the range of 2 to 2√2 times h2. h3/h2 may also be in the range of 1.8 to 2 or in the range of 2√2 to 3.2.

The ratio w3/w2 and/or the ratio h3/h2 may also be in the range of 1.0 to 6.0. However, the use of ratios near 1.0 may lead to spatial aliasing of the output image IMG2, and the use of ratios near 6.0 may lead to excessive smoothing of the output image IMG2.

When the horizontal scaling factor $CF_H$ and/or the vertical scaling factor $CF_V$ of a Bayer format input image IMG1 is in the vicinity of the value 2.0, the ratio w3/w2 and/or the ratio h3/h2 may be e.g. in the range of 3.2 to 4.0 in order to ensure that that several input pixels P1 contribute to each output pixel value P2. The ratio w3/w2 and/or the ratio h3/h2 may be selected e.g. such at least nine input pixels P1 may contribute to each output pixel value P2.

The maximum number of rows and columns of the filter array FA1 is determined in step 925. The maximum number Mmax of columns of a filter array FA1 may be determined e.g. by dividing the width w3 of the perimeter PRM of a filter array FA1 by the horizontal distance w1 between the centers of pixels P1 of the input image IMG1, and by rounding the result upwards or downwards to an integer value. The maximum number Nmax of rows of a filter array FA1 may be determined respectively.

Rounding the result downwards reduces the number of arithmetic operations, increases speed, and reduces the memory size needed for the operations.

Mmax may be e.g. in the range of 0.6 to 1.2 times the ratio w3/w2, preferably in the range of 0.8 to 1 times the ratio w3/w2. Too low values of Mmax may lead to a situation where too few pixels P1 of the input image IMG1 contribute to the output pixel P2. Values of Mmax in excess of 1.0 times w3/w2 just add zeros to the filter array, and needlessly slow down the calculations.

Also Nmax may be e.g. in the range of 0.6 to 1.2 times the ratio h3/h2, preferably in the range of 0.8 to 1.0 times the ratio h3/h2.

The values of the elements E(m,n) may be determined in step 930. The values of the reference surface REFS at the locations corresponding to the indices m,n may be calculated based on the location of the base point, and the width w3 and height h3 of the perimeter PRM. Alternatively, the values of the elements E(m,n) may be retrieved from a database.

If desired, the values of the elements E(m,n) may be rounded, truncated or multiplied by a common multiplier to integer values in step 935. The use of integer values facilitates calculations.

The input image IMG1 may be captured by an image sensor in step 940. Alternatively, the input image IMG1 may be retrieved from a memory.

In step 945, the values of the pixels P2 of the output image IMG2 are determined by performing the sum-of-products operations between the filter array FA1 and the pixels of the input image IMG1 located at respective positions. Several different filter arrays $FA_{11}, FA_{21}, FA_{12}, FA_{22}$ may be applied.

If the input image IMG1 is an Bayer format image, the Gr and Gb components of the Bayer format image may be combined in step 950, according to the selected output type. However, the Gr and Gb components may also be combined already in the sum-of-products step 945 by using e.g. the filter array of FIG. 19b.

If desired, the pixel values of the output image IMG2 may be normalized or divided by a common value in step 955.

If desired, the pixel values of the output image IMG2 may be further compressed e.g. by DPCM/PCM compression or quantization in step 960.

The quality of fitting the elements E(m,n) to the reference surface REFS may be estimated e.g. by calculating the RMS deviation of the non-zero elements E(m,n) of the filter array FA1 with respect to the reference surface REFS. RMS is the acronym for Root Means Square. The RMS deviation $\Delta_{RMS}$ of the non-zero elements E(m,n) from a parabolic reference surface REFS may be e.g. smaller than 10% of the average value $E_{MEAN}$ of said non-zero elements E(m,n). Advantageously, the RMS deviation $\Delta_{RMS}$ is smaller than 5% of the average value $E_{MEAN}$ of said non-zero elements E(m,n). Preferably, the RMS deviation $\Delta_{RMS}$ is smaller than 3% of the average value $E_{MEAN}$ of said non-zero elements E(m,n).

$$\Delta_{RMS} = \sqrt{\frac{1}{P}\sum_{m,n}(z(u_m, v_n) - E(m, n))^2} \tag{11}$$

The summation is made over all combinations of indices m and n associated with non-zero elements E(m,n) of the filter array FA1. $z(u_m, v_n)$ indicates the value of the reference surface REFS at the coordinates $u_m, v_n$. P indicates the number of said non-zero elements E(m,n).

When comparing the elements E with a paraboloid reference surface REFS, the function $z(u_m, v_n)$ may also be understood to represent an elliptic paraboloid function which provides the best fit to the values E(m,n). In other words, when evaluation the quality of the approximation, the maximum value, center, major axis, and minor axis of an elliptic paraboloid function $REFS(u_m, v_n)$ may be selected so as to minimize the RMS deviation $\Delta_{RMS}$.

The average value $E_{MEAN}$ of the elements E(m,n) is given by:

$$E_{MEAN} = \frac{1}{P}\sum E(m, n) \tag{12}$$

Where the sum is calculated over all non-zero elements E(m,n) of the filter array FA1.

Alternatively, it may be defined that the deviation of each non-zero element E(m,n) of the filter array FA1 from the paraboloid reference surface REFS is smaller than or equal to 5% of the highest value $Z_{MAX}$ of the paraboloid surface REFS. If the element values are not rounded to integer values, the deviation of each non-zero element E(m,n) of the filter array FA1 from the paraboloid reference surface REFS may even be smaller than or equal to 0.5% of the highest value $Z_{MAX}$ of the paraboloid surface REFS.

Figure 24B:
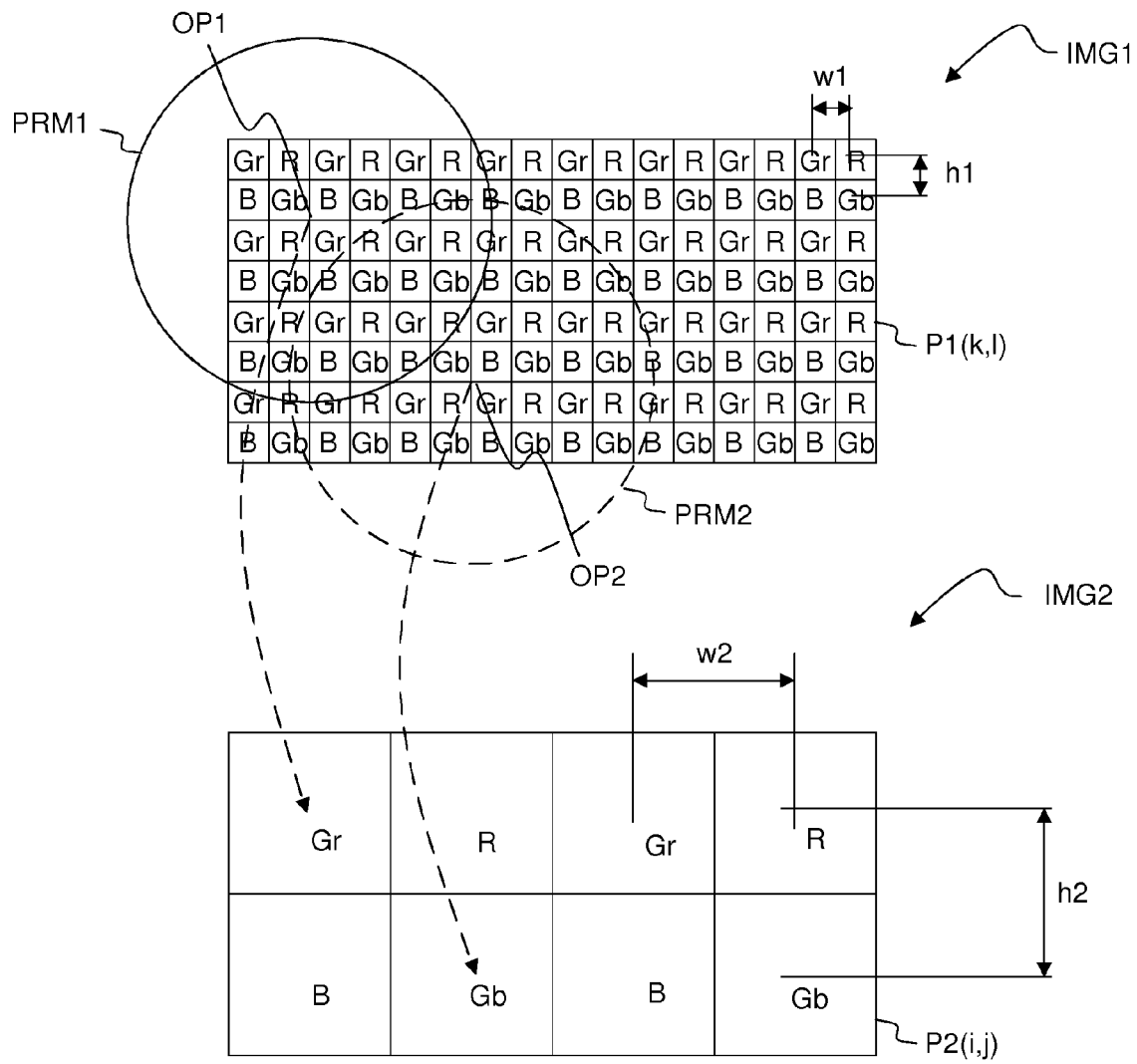
FIG. 24b shows converting a Bayer format input image into a Bayer format output image of lower image resolution.

FIG. 24b shows converting a Bayer format input image IMG1 into a Bayer format output image IMG2. When determining e.g. the value of the output pixel P2 at the upper left corner, the filter array may be superimposed on the input image such that the base point BP of the filter array coincides with the location OP1 of the said output pixel P2. The desired output pixel P2 represents the green Gr component, and the green Gr pixels of the input image IMG1 which are within the perimeter PRM1 may contribute to the value of said output pixel. OP2 denotes the location of another output pixel P2 associated with the green Gb component.

The sum-of-products operation may be repeated for each pixel P2 of the output image IMG2 by superimposing the filter arrays to respective locations.

The sum-of-products operation may be performed for each color component R, Gr, Gb, B separately, but by using different filter arrays.

The filter array for providing the value of a Gr pixel of the output image IMG2 may also comprise elements E, which coincide with the locations of Gr pixels of the input image IMG1, and elements E which coincide with the locations of Gb pixels of the input image IMG1. Consequently, substantially all green values which are within the perimeter PRM1 of said filter array may contribute to the value of said Gr pixel of the output image IMG2. This may improve the spatial frequency response. Respectively, a filter array for providing the value of a Gb pixels of the output image IMG2 may also be arranged to take into account substantially all green values within its perimeter PRM2.

When converting a raw Bayer format RGB image into a co-sited RGB image, the horizontal scaling factor $CF_H$ and/or the vertical scaling factor $CF_V$ may be greater than two in order to compress image data.

A co-sited RGB input image may also be converted into a lower-resolution Bayer format output image by using suitable filter arrays (not shown in FIG. 24b).

A YUV input image IMG1 may be converted into a lower-resolution YUV output image IMG2

Figure 24C:
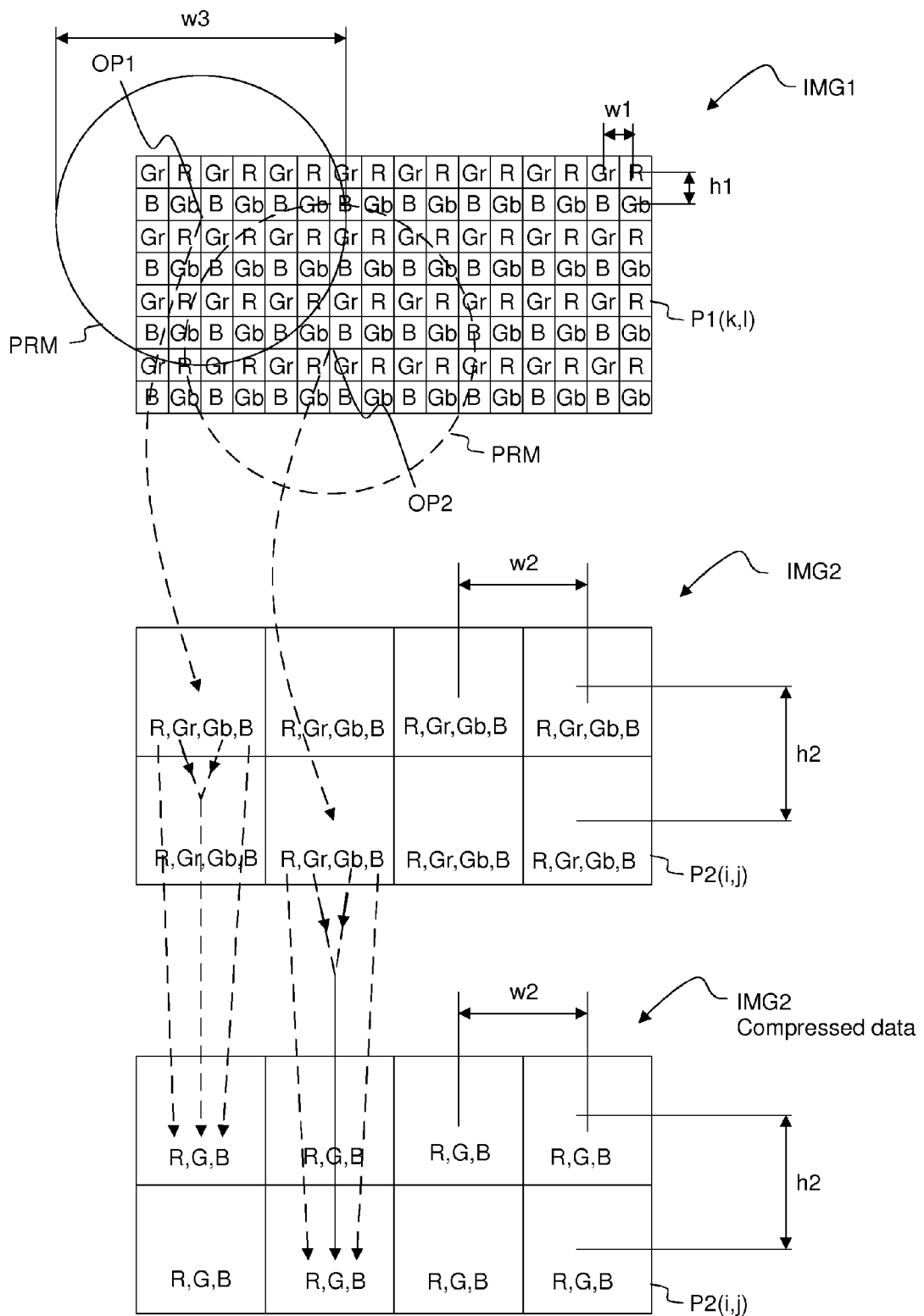
FIG. 24c shows converting a Bayer format input image into a co-sited RGB format image of lower image resolution.

FIG. 24c shows converting a Bayer format input image IMG1 into a co-sited RGB output image IMG2, and further compressing the data of said RGB output image IMG2.

When determining e.g. the value of the output pixel P2 at the upper left corner, the filter array may be superimposed on the input image such that the base point BP of the filter array coincides with the location OP1 of the said output pixel P2. The desired output pixel P2 may be associated with four color components R, Gr, Gb, and B. When determining e.g. the value of the red component of said output pixel P2, the red pixels of the input image IMG1 which are within the perimeter PRM may contribute to the value of said output pixel. Each color component R, Gr, Gb, B may be processed separately.

The image data of the output image IMG2 may be further compressed e.g. by combining the green components Gr and Gb associated with a predetermined pixel P2 of the output image IMG2. The components Gr and Gb may be combined e.g. by summing or averaging. This operation provides 25% reduction in the size of image data.

The components Gr and Gb may also be combined already when performing the sum-of-products operation, by using a combining array shown e.g. in FIG. 19b.

The pixels of a Bayer format input image IMG1 may also be binned prior to performing the sum-of-products operations with the filter arrays. The binning operation may comprise combining R pixels of a pixel group to form a binned R pixel, combining Gr pixels of said group to form a binned Gr pixel, combining Gb pixels of said group to form a binned Gb pixel, and combining B pixels of said group to form a binned B pixel. Said pixel group may be e.g. a 4×4 array within the original Bayer format image, wherein said pixel group comprises four pixels for each color component R, Gr, Gb, and B. The four red pixels of said group form a 2×2 sub-array. The center of the binned red pixel obtained by combining the four red pixels may be positioned at the center of said 2×2 sub-array. The positions of the binned Gr pixel, the binned Gb pixel, and the binned blue pixel may be determined, respectively. Consequently, the binned pixels may be overlapping such that the centers of the binned pixels do not coincide.

When using binned pixels as the input pixels of the input image IMG1, the position of the base point BP of a filter array FA1 may substantially coincide with the geometrical center of a sub-array consisting of several binned pixels of a predetermined color.

Referring back to FIGS. 21a-23, the size of image data may also be compressed by using image elements SPIX. The philosophy behind the image elements SPIX is that luminosity information is typically more important than color information. Consequently, the color information may be compressed more than information regarding the variations in spatial luminosity.

Figure 25A:
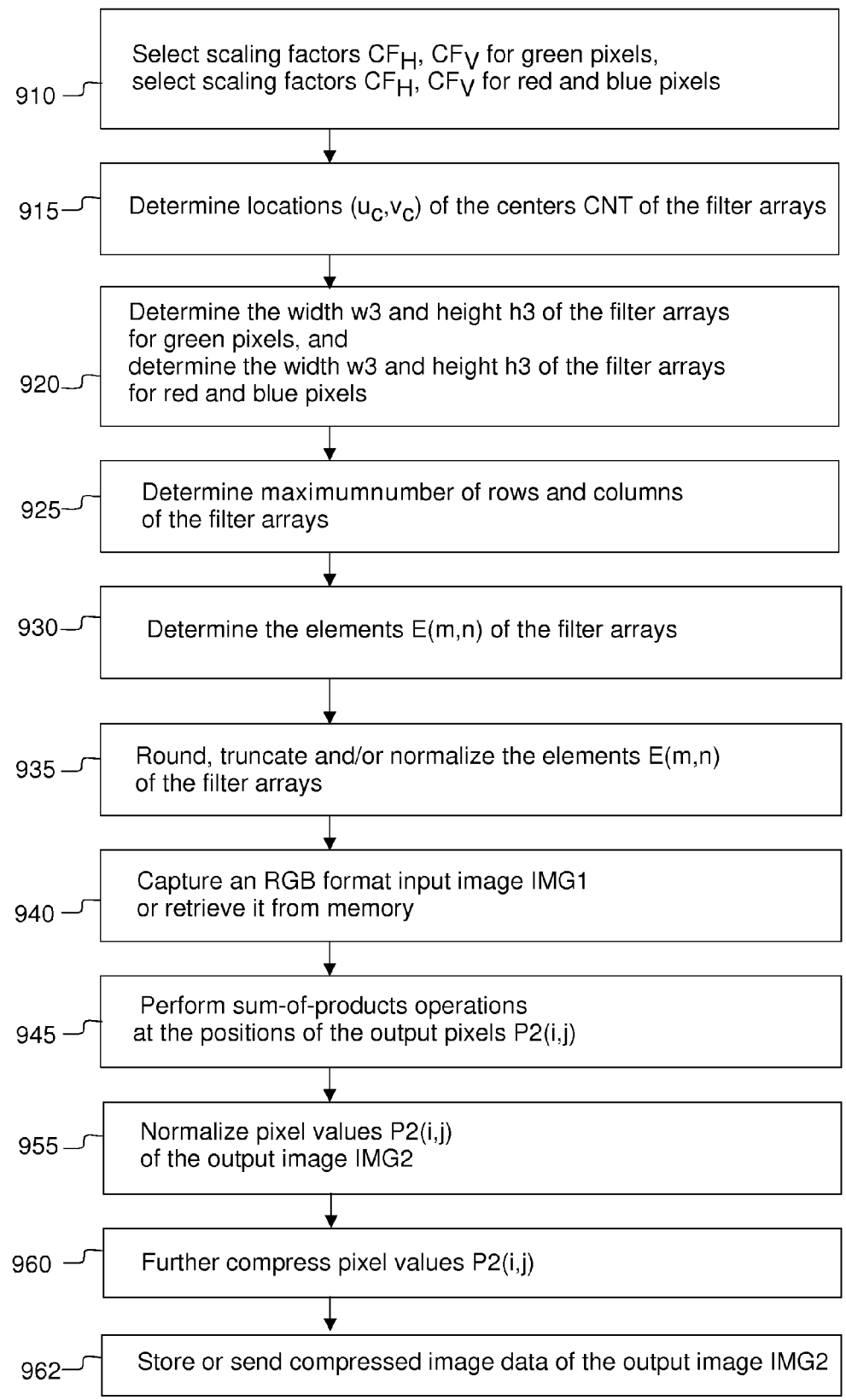
FIG. 25a shows method steps for converting an RGB format input image into an output image of lower image resolution.

FIG. 25a is a block diagram showing method steps for directly obtaining the image elements SPIX. The scaling factors $CF_H$ and $CF_V$ for the red and blue pixels P1 may be substantially greater than the scaling factors $CF_H$ and $CF_V$ for the green pixels P1. In other words, the width w3 of the filter array for processing red and blue color components may be substantially greater than the width w3 of the filter array for processing the green components of the filter array.

The calculations may be performed faster and/or by using less memory space when providing the common values $R_{COM}$ and $B_{COM}$ directly, when compared with a multi-phase process where e.g. the output image IMG2 or the compressed output image formed by the method of FIG. 24c is further processed to form image elements SPIX according to e.g. FIG. 21a or 21b.

The compressed image data may be stored or transmitted in step 962.

YUV-format images may also be processed in the same way to form image elements SPIX. The scaling factors $CF_H$ and $CF_V$ for the chroma pixels of the input image IMG1 may be substantially greater than the scaling factors $CF_H$ and $CF_V$ for the luminance pixels of said input image IMG1. In other words, the width w3 of the filter arrays for processing U an V components may be substantially greater than the width w3 of the filter arrays for processing the Y components of the filter array.

Figure 25B:
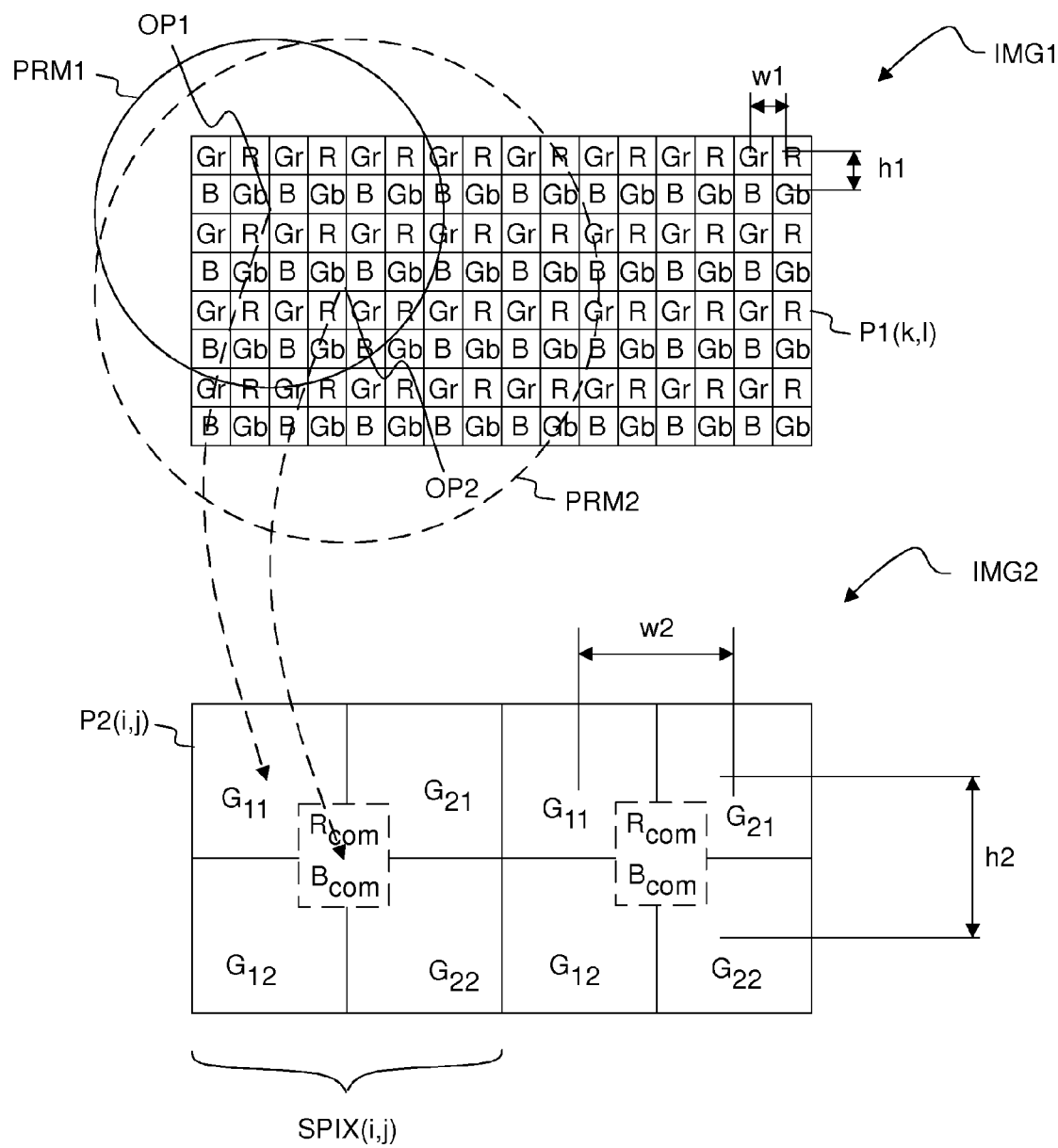
FIG. 25b shows converting a Bayer format input image into an RGB format output image of lower image resolution.

Referring to FIG. 25b, the reference surface REFS of the filter array for processing the green components Gr, Gb may have a perimeter PRM1, and the reference surface REFS of the filter arrays for processing the red and blue components may have a substantially larger perimeter PRM2. The center CNT of the perimeter PRM1 may be put to the point OP1, and the center of the perimeter PRM2 may be put to the point OP2. The point OP1 indicates the location of the upper left green output pixel $G_{11}$ of an image element SPIX. The point OP2 indicates the location of the center of the common red output pixel $R_{COM}$ and blue output pixel $B_{COM}$. The image element SPIX may further comprise three other green output pixels $G_{21}$, $G_{12}$, and $G_{22}$ located at different points. The center OP2 of the common red and blue output pixels may be substantially at the center of a pattern formed by the four green output pixels.

Thus, the distance between adjacent red output pixels $R_{COM}$ of the output image IMG2 may be e.g. two times the distance w2 between adjacent green pixels $G_{11}$, $G_{21}$ of the output image IMG2. Thanks to the wider coverage of the perimeter PRM2, the resulting red output pixel $R_{COM}$ represents the value of the red color component associated with the four different green pixels. Thus, performing the sum-of-products operations may directly provide the image elements SPIX containing common red and blue color component values (See FIGS. 21a, 21b, and 22).

When processing a YUV input image IMG1, the width w3 of the perimeter PRM2 of the filter arrays for processing U an V components may be substantially greater than the width w3 of the perimeter PRM1 of the filter arrays for processing the Y components of the filter array. Thus, performing the sum-of-products operations may directly provide the image elements SPIX containing common U and V color component values associated with several Y values (see FIG. 23).

The green values of an RGB image may represent up to 59% of total luminance information. Conversion of the RGB image into a YUV image may facilitate preserving luminance information in a situation where color information is partially lost. The luminance values (Y) represent 100% of total luminance information.

Figure 26A:
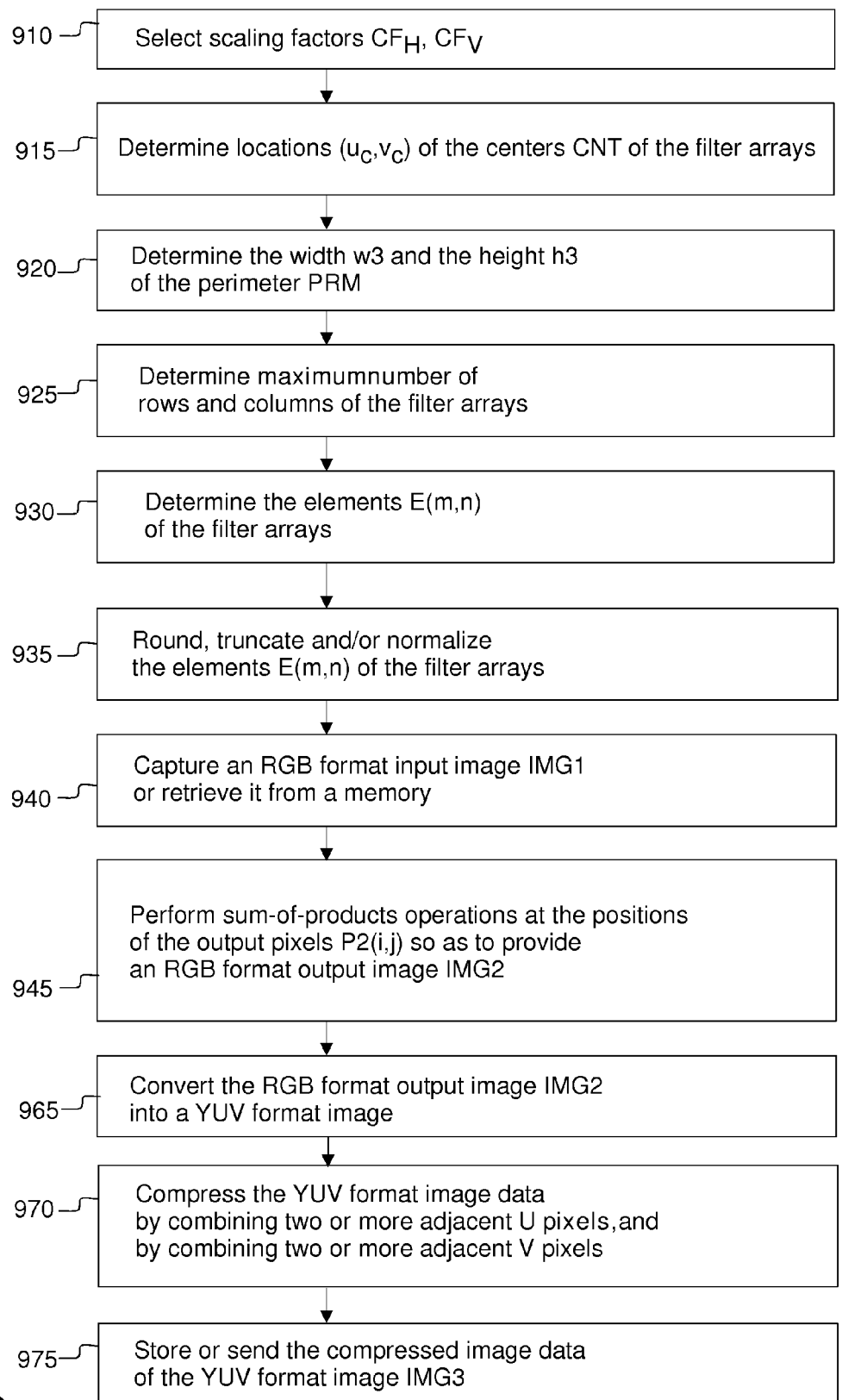
FIG. 26a shows method steps for converting an RGB input image into a YUV format image of lower image resolution.

FIG. 26a shows method steps for compressing image data, said method comprising:
  providing a lower-resolution RGB output image based on an RGB input image,
  converting the RGB output image into an YUV image (step 965), and
  combining the values of adjacent chroma pixels so as to form common chroma values $U_{COM}$ and $V_{COM}$ associated with several luminance values $Y_{11}$, $Y_{12}$, $Y_{21}$, $Y_{22}$ (step 970).

The several luminance values $Y_{11}$, $Y_{12}$, $Y_{21}$, $Y_{22}$ may form image elements SPIX together with the common chroma values $U_{COM}$ and $V_{COM}$ (See also FIG. 23)

The compressed image data of the YUV image IMG3 may be stored in a memory or sent in step 975.

When the image data is retrieved from the memory or received, each of the luminance values $Y_{11}$, $Y_{12}$, $Y_{21}$, $Y_{22}$ may be converted back to pixels of an RGB image by using the values of the common chroma values $U_{COM}$ and $V_{COM}$. If desired, the restored RGB image may be upsampled e.g. by interpolation.

Figure 26B:
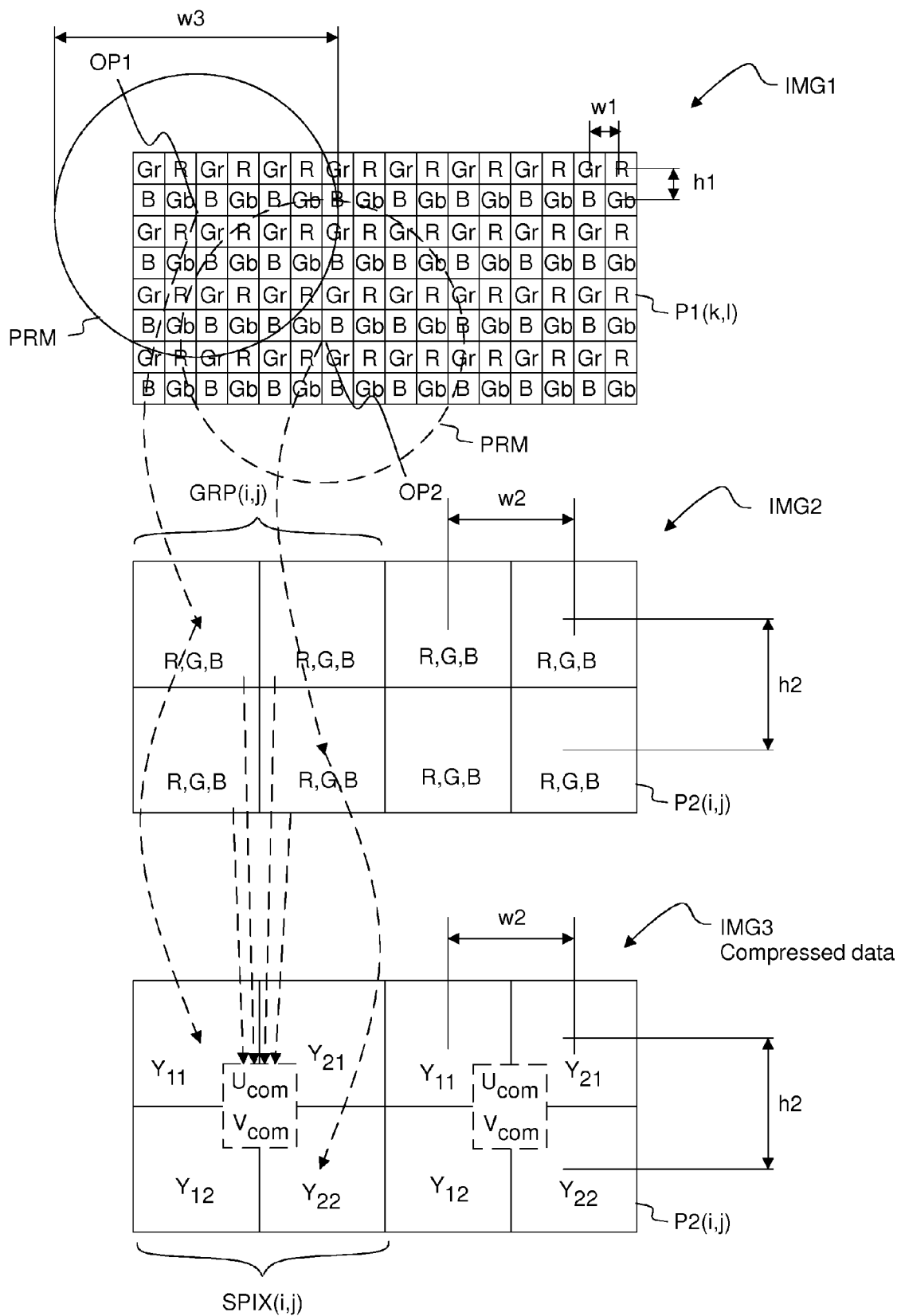
FIG. 26b shows converting an RGB input image into an YUV format image of lower image resolution.

Referring to FIG. 26b, an RGB input image IMG1 may be downsampled into an RGB output image IMG2 as discussed e.g. with reference to FIG. 24c.

The RGB output image IMG2 may be further converted into a YUV image, and adjacent chroma values of said YUV image may be combined so as to form common chroma values $U_{COM}$ and $V_{COM}$ associated with several luminance values $Y_{11}, Y_{12}, Y_{21}, Y_{22}$.

The method steps shown in FIGS. 24a, 25a, and 26a may be performed simultaneously and/or in a different order, provided that the required information (e.g. image data or element values) is available for each method step when said method step is performed.

According to the previous examples, the filter array FA1 comprises positive and zero elements E(m,n). However, the filter array FA1 may alternatively comprise negative and zero-valued elements E(m,n). In that case the sign of the pixel values of the input image IMG1 or the sign of the pixel values of the output image IMG2 may be changed in order to provide a positive-valued output image IMG2.

Figure 27:
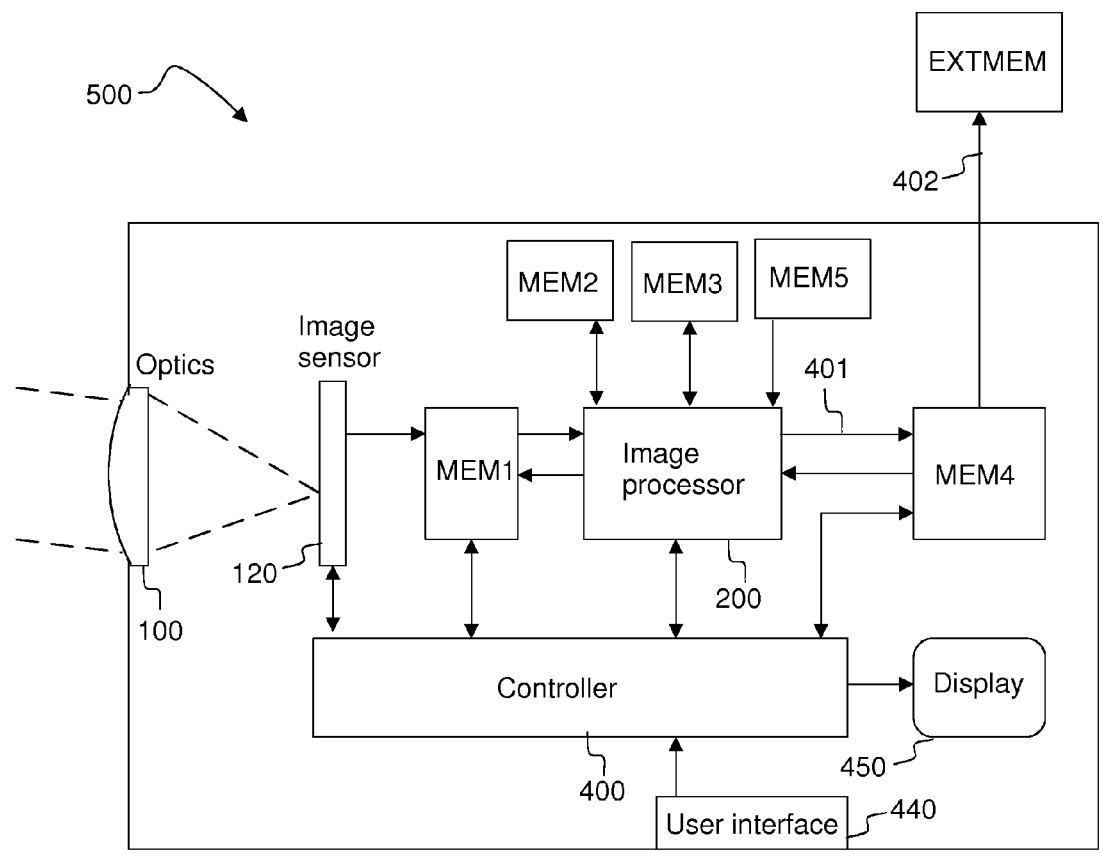
FIG. 27 shows an imaging device.

Referring to FIG. 27, an imaging device 500 may comprise imaging optics 100, an image sensor 120, an input memory MEM1, a memory MEM2 for storing filter arrays FA1, an operational memory MEM3, an output memory MEM4 to store output images IMG2, a display 450 to visually display images IMG1 or IMG2, a controller 400 to control the operation of the imaging device 500, a computer-readable memory MEM5 to store computer program code for the data compression algorithms, an image processing unit 200, an user interface 440 to receive commands from a user, and a data bus 401 for transferring image data from the image processing unit 200 to the output memory MEM4.

Output image data may also be transmitted from the image processing unit 200 and/or from the output memory MEM4 to an external memory EXTMEM via a data bus 402.

The imaging optics 100 may be e.g. a focusing lens. The image sensor 120 may be e.g. a two-dimensional CMOS or CCD sensor. The sensor 120 may be arranged to provide e.g. greyscale data or multi-color data (e.g. RGB, Bayer, or YUV).

The input memory MEM1 may at least temporarily store at least a few rows or columns of the pixels P1 of the input image IMG1. Thus, the input memory may be arranged to store at least a part of the input image IMG1.

The image processor 200 may be arranged to determine the elements E(m,n) of the filter arrays needed for the image compression algorithm. The values of the elements may be calculated according to commands received via the user interface 440 and stored to the memory MEM2. Alternatively, the values of the elements E(m,n) may be retrieved from the memory MEM2.

The operational memory MEM3 may be used e.g. when performing the sum-of-products operations (see equations 8a and 9a).

The perimeter PRM of a filter array FA1 may enclose e.g. up to nine output pixel positions. FIG. 9 shows a situation where a perimeter PRM encloses five output pixel positions, namely the points (x1,y2), (x2,y1), (x2,y2), (x2,y3), and (x3, y2). These five (or nine) output pixel positions may be located on three different rows (or columns).

Thus, an input pixel may contribute to only three different rows or columns of the output image IMG2. This means that it is enough if the operational memory MEM3 has space for calculating sums corresponding to three rows of pixels P2 of the output image IMG2.

Thanks to the data compression according to the present invention, the output memory MEM4 and/or the external memory EXTMEM may store a greater number of output images IMG2 than without data compression. Alternatively or in addition, the size of the memory MEM4 and/or EXTMEM may be smaller than without data compression. Also the data transmission rate via the data bus 401 and/or 402 may be lowered.

There are at least two different ways for determining the output image IMG2 from the input image IMG1.

In the first way, it is assumed that all input pixel values P1 needed for calculating a single output pixel value P2 are available substantially simultaneously. In this mode, the input memory MEM1 has to comprise as many pixel rows or columns as the filter array, i.e. the input memory MEM1 has to comprise at least Nmax rows and at least Mmax columns of input pixels P1.

In the second way, it is sufficient if the input memory MEM1 comprises a single input pixel value P1 at a time. The single input pixel value P1 may contribute to several output pixels P2. Sum-of-product values associated with several output pixels P2 may be simultaneously stored in the operational memory MEM3. The sum-of-product value of a predetermined output pixel P2 may be increased when a new input pixel value P1 is stored into the input memory MEM1, until the sum-of-products operation for said predetermined output pixel P2 has been fully completed.

The input image IMG1 may be processed on the fly in order to minimize the use of memory space and/or in order to reduce the processing time. In other words, first output pixels P2 may be determined before the exposure of the last input pixels P1 has been completed. Some input pixels P1 may even be deleted before the last output pixels P2 have been determined.

If desired, the image data of the output image IMG2 may be further compressed e.g. by applying a DPCM/PCM compression algorithm described e.g. in WO2004/064402. The DPCM/PCM compression may be used to convert e.g. a single 10-bit byte representing the value of an output pixel P2 into a single 6-bit byte, or to convert a 12-bit byte into a 8-bit byte.

The device 500 may also be implemented without the imaging optics 100 and the image sensor 120. In that case the device 500 may be arranged to process input images IMG1 previously captured and stored in the input memory MEM1.

The memories MEM1, MEM2, MEM3, MEM4, and/or MEM5 may be physically located in the same memory unit. For example, the memories MEM1, MEM2, MEM3, MEM4, and/or MEM5 may be allocated memory areas in the same component.

If the device 500 comprises a display 450, the device 500 may be arranged to provide the output image IMG2 such that the output image IMG2 optimally matches with the display 450. In particular, the number of pixel rows of said display may be an integer multiple of the number of pixel rows of said output image IMG2, and/or such that the number of pixel columns of said display may be an integer multiple of the number of pixel columns of said output image IMG2.

The device 500 may further comprise e.g. a data processing unit, memory and communications unit to provide access to a mobile telephone network, internet or local area network. The device 500 may be or may be a part of a device selected from the following list: a display module connectable to a further device, portable device, device with wireless telecommunicating capabilities, imaging device, mobile phone, gaming device, music recording/playing device (based on e.g. MP3-format), remote control transmitter or receiver, navigation instrument, measuring instrument, target finding device, aiming device, navigation device, personal digital assistant (PDA), communicator, portable internet appliance, handheld computer, accessory to a mobile phone.

The device 500 may be arranged to compress data of an input image IMG1, which is e.g. graphics or text.

Figure 28:
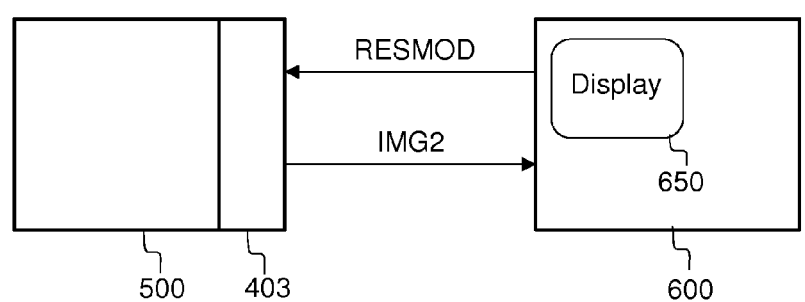
FIG. 28 shows an image processing device arranged to transmit an output image to a remote terminal.

Referring to FIG. 28, the device 500 may be arranged to receive a resolution mode signal RESMOD from a remote terminal 600, and the device 500 may be arranged to determine a horizontal and/or a vertical scaling factor $CF_H$, $CF_V$ for an output image IMG2 based on said resolution mode signal RESMOD. The remote terminal 600 may comprise a display 650. The resolution mode signal RESMOD is a signal, which directly or indirectly indicates a desired number of rows and columns of the output image IMG2. The resolution mode signal RESMOD may e.g. comprise information about the manufacturer and the type of the display 650. A database may contain information about the number of pixels rows and columns for several different displays. The controller 400 of the device 500 may be arranged to determine optimum scaling ratios based on the signal RESMOD and the information contained in said database.

The remote terminal 600 may be arranged to send the resolution mode signal RESMOD automatically or based on a selection made by a user. Thus, a scaled output image IMG2 may be transmitted to said remote terminal. The device 500 may comprise a communications interface 403 for transmitting image data e.g. via internet or mobile telephone network. The remote terminal 600 may be e.g. a mobile telephone. Thus, the user of the remote terminal may e.g. request a photo of a person such that the photo can be transferred from a server to the terminal in a short time, while still providing optimum resolution for viewing with the display 650. In particular, the image IMG2 may transferred from an internet server to a mobile phone via a mobile phone network.

In general, the reference surface REFS associated with a filter array FA1 may reach a zero value at substantially elliptical perimeter PRM, and the reference surface REFS may have a maximum value at a base point BP. The distance between the base point BP and the perimeter PRM may be greater than or equal to w3 multiplied by 0.25 and greater than or equal to h3 multiplied by 0.25

In principle, the reference surface REFS could also be ellipsoidal, in particular spherical. However, calculating values of an ellipsoidal surface is again more time-consuming than calculating values for a paraboloid.

In principle, the values of the elements of the filter array FA1 could also approximate the central portion of a circular sinc (sincus) function. The shape of the circular sinc function resembles the shape of a Mexican sombrero hat. Filtering by using a sinc function provides an ideal spatial frequency response for many cases.

The sinc function comprises an infinite number of zero-crossings, wherein values in the central portion are positive, values between the first zero-crossing and the second zero-crossing are negative, values between the second and third zero-crossing are positive, etc. The values of the elements of the filter array FA1 may also represent a larger portion of the circular sinc function, wherein said portion extends beyond the first zero crossing of the sinc function. The values of the elements of the filter array FA1 may e.g. approximate the circular sinc function up to the second zero-crossing of the sinc function in order to further improve the spatial frequency response, i.e. the filter array FA1 may comprise positive values of the circular sinc function associated with the central portion of the sinc function, and also negative values of the circular sinc function attained between the first and second zero crossings.

However, the filter array whose elements approximate a paraboloid surface may provide almost as good frequency response characteristics as a filter array representing a circular sinc function. An advantage associated with using a paraboloid approximation when compared with the circular sinc function is that time-consuming calculation of the values of the sinc function may be avoided. Furthermore, there is no necessary to make calculations with negative numbers. Furthermore, it is not necessary to apply further windowing functions when using the paraboloid approximation. The filter array may be adapted easily for different scaling factors simply by adjusting the width of the paraboloid surface.

The reference surface REFS may also approximate a circular Gaussian function. The reference surface REFS may be forced to approach zero at a limited radius e.g. by subtracting a constant from the values of the Gaussian function.

The selection of the suitable form of the reference surface REFS may be made based on the time available for numerical signal processing, and based on the time available for data transfer. If the speed of calculations is not an issue, then a filter array approximating e.g. the central part of a circular sinc function could also be used, instead of the paraboloid approximation.

A co-sited input image IMG1 may also be converted into a Bayer format output image IMG2 by performing the sum-of-products operations such that the output image IMG2 has a higher resolution than the input image IMG1, i.e. w2<w1. However, even in that case the size of the image data of the output image IMG2 may still be smaller than the size of the image data of the input image IMG1.

Performing the sum-of-products operation with a two-dimensional filter array FA1 provides horizontal and vertical scaling at the same time.

Image data may also be compressed in two or more steps. For example, an input image may be scaled horizontally, and the horizontally scaled image may subsequently be scaled vertically, or vice versa. An image may be scaled horizontally by performing the sum-of-products operation with a one-dimensional filter array (i.e. a vector), which has only one row of elements. An image may be scaled vertically by performing the sum-of-products operation with a one-dimensional filter array, which has only one column of elements. The values of the elements of the one-dimensional arrays may approximate e.g. a parabola.

Data compression by using a two-dimensional filter array FA1 may also be combined with a separate horizontal or vertical scaling step. The horizontal or vertical scaling step may be performed prior to or after processing with the two-dimensional filter array FA1.

The drawings are schematic. For the person skilled in the art, it will be clear that modifications and variations of the devices, methods and data structures according to the present invention are perceivable. The particular embodiments described above with reference to the accompanying drawings are illustrative only and not meant to limit the scope of the invention, which is defined by the appended claims.

The invention claimed is:

1. A method comprising:
   providing an output image based on an input image comprising:
   determining a location of an output pixel with respect to said input image,
   determining values of elements of a filter array such that non-zero value elements of said filter array approximate a paraboloid reference surface, wherein said reference surface has a maximum at a base point, wherein a root mean square deviation of said non-zero value elements from said reference surface is smaller than 10% of an average value of said non-zero value elements, and determining a value of said output pixel by performing a sum-of-products operation between non-zero values of said elements and values of input pixels of said input image located at respective positions, wherein said filter array is superimposed on said input image such that a location of said base point corresponds to the location of said output pixel, wherein a number of columns of said filter array is in a range of 0.6 to 1.2 times a width of a perimeter of said filter array divided by a horizontal distance between adjacent input pixels of said input image.

2. The method of claim 1 comprising:
selecting a horizontal scaling factor and a vertical scaling factor for said output image, and
determining the values of the elements of said filter array based on the location of said output pixel with respect to said input image, and based on said horizontal scaling factor and said vertical scaling factor.

3. The method of claim 1, wherein said filter array is superimposed on said input image such that said base point coincides with a center of said output pixel.

4. The method of claim 1, wherein said base point is positioned asymmetrically with respect to the elements of said filter array.

5. The method of claim 1, wherein said reference surface reaches zero value at an elliptical perimeter, the width of said elliptical perimeter being in the range of 1.8 to 3.2 times the horizontal distance between adjacent output pixels of said output image.

6. The method of claim 1 further comprising determining the values of a plurality of output pixels of said output image by calculating a convolution between a flipped filter array and at least a part of the input image, wherein said flipped filter array has been obtained by flipping said filter array horizontally and vertically.

7. The method of claim 1, wherein a horizontal distance between adjacent output pixels of said output image is not an integer multiple of a horizontal distance between adjacent input pixels of said input image, said method further comprising:
determining a plurality of different filter arrays corresponding to a plurality of adjacent output pixels of said output image, and
determining values of said adjacent output pixels by using said different filter arrays.

8. The method of claim 7, wherein the number of different filter arrays applied is greater than or equal to sixteen.

9. The method of claim 1, wherein said input image comprises red, green and blue pixels, and said method further comprises applying a first filter array to determine a green output pixel of said output image, and applying a second filter array to determine a red output pixel, a width of a perimeter of a reference surface of said first filter array being substantially smaller than a width of a perimeter of a reference surface of said second filter array.

10. The method of claim 1, wherein said output image comprises red, green and blue pixels, and a number of green pixels of said output image is substantially greater than a number of red pixels of said output image.

11. The method of claim 1, wherein said input image comprises a rectangular group of four pixels, said rectangular group having a red pixel, a blue pixel, a first green pixel, and a second green pixel, and wherein said output image comprises a pixel value representing said first green pixel and said second green pixel.

12. The method of claim 1, wherein said input image comprises luminosity pixels, and chroma pixels, and said method further comprises applying a first filter array to determine a value of a luminosity pixel of said output image, and applying a second filter array to determine a value of a chroma pixel, a width of a perimeter of a reference surface said first filter array being substantially smaller than a width of a perimeter of the reference surface of said second filter array.

13. The method of claim 1, wherein said output image comprises red, green and blue pixels, said method further comprising converting said output image into a YUV format image, such that a number of luminosity pixels of said YUV format image is substantially greater than a number of first chroma pixels of said YUV format image.

14. A non-transitory computer readable medium comprising program code, which when executed by a data processor is for executing a method of:
determining a location of an output pixel with respect to an input image,
determining values of elements of a filter array such that non-zero value elements of said filter array approximate a paraboloid reference surface, wherein said reference surface has a maximum at a base point, wherein a root mean square deviation of said non-zero value elements from said reference surface is smaller than 10% of an average value of said non-zero value elements, and
determining a value of said output pixel by performing a sum-of-products operation between non-zero values of said elements and values of input pixels of said input image located at respective positions, wherein said filter array is superimposed on said input image such that a location of said base point corresponds to the location of said output pixel, wherein a number of columns of said filter array is in a range of 0.6 to 1.2 times a width of a perimeter of said filter array divided by a horizontal distance between adjacent input pixels of said input image.

15. An apparatus comprising:
at least one processor; and
at least one memory including computer program code, where the at least one memory and the computer program code are configured, with the at least one processor, to cause the apparatus to at least:
provide an output image based on an input image, said apparatus comprising an image processing unit arranged to:
determine a location of an output pixel with respect to said input image,
determine values of elements of a filter array such that non-zero value elements of said filter array approximate a paraboloid reference surface, said reference surface having a maximum at a base point, wherein a root mean square deviation of said non-zero value elements from said reference surface is smaller than 10% of an average value of said non-zero value elements, and
determine a value of said output pixel by performing a sum-of-products operation between non-zero values of said elements and values of input pixels of said input image located at respective positions such that said filter array is superimposed on said input image, and such that a location of said base point corresponds to the location of said output point, wherein a number of columns of said filter array is in a range of 0.6 to 1.2 times a width of a perimeter of said filter array divided by a horizontal distance between adjacent input pixels of said input image.

16. The apparatus of claim 15 further comprising an image sensor to capture said input image.

17. The apparatus of claim 15, wherein said apparatus comprises a mobile phone, which comprises a digital camera.

18. The apparatus of claim 15, wherein said apparatus is arranged to receive a resolution mode signal from a remote terminal, and said apparatus is further arranged to determine pixel values of said output image based on said resolution mode signal, and to transmit the pixel values of said output image to said remote terminal.

* * * * *